US007222351B2

(12) United States Patent
Tsutsumi et al.

(10) Patent No.: US 7,222,351 B2
(45) Date of Patent: May 22, 2007

(54) SHUTTER CLOSING MECHANISM AND DISC DRIVING APPARATUS

(75) Inventors: Hideaki Tsutsumi, Tokyo (JP);
Manabu Obata, Kanagawa (JP);
Zensaku Mitsuji, Kanagawa (JP);
Mitsunori Matsumura, Tokyo (JP)

(73) Assignee: Sony Corporation, Tokyo (JP)

( * ) Notice: Subject to any disclaimer, the term of this patent is extended or adjusted under 35 U.S.C. 154(b) by 397 days.

(21) Appl. No.: 10/816,806

(22) Filed: Apr. 2, 2004

(65) Prior Publication Data

US 2004/0250267 A1  Dec. 9, 2004

(30) Foreign Application Priority Data

Apr. 4, 2003 (JP) ............... 2003-102345

(51) Int. Cl.
*G11B 23/03* (2006.01)
*G11B 17/04* (2006.01)
(52) U.S. Cl. ............. 720/643; 720/644; 720/601; 720/630
(58) Field of Classification Search ........... 720/643, 720/601, 633, 644, 742, 738, 739, 740, 741, 720/743, 744
See application file for complete search history.

(56) References Cited

U.S. PATENT DOCUMENTS

| 5,278,717 | A | * | 1/1994 | Sasaki et al. ............. 360/133 |
| 5,940,550 | A | | 8/1999 | Plickert et al. |
| 6,376,765 | B1 | | 4/2002 | Wariishi et al. |
| 6,560,186 | B2 | * | 5/2003 | Yeon ............... 720/739 |
| 6,586,670 | B2 | | 7/2003 | Yoshikawa |
| 6,602,998 | B2 | | 8/2003 | Kobuke et al. |

(Continued)

FOREIGN PATENT DOCUMENTS

EP  1 058 260 A1  12/2000

(Continued)

OTHER PUBLICATIONS

Uchida, Satoshi, "Application of Titania Nanotubes to A Dye-Sensitized Solar Cell," Electrochemistry, Jun. 2002, vol. 70, No. 6, pp. 418-420.

(Continued)

*Primary Examiner*—Thang V. Tran
*Assistant Examiner*—Matthew G. Kayrish
(74) *Attorney, Agent, or Firm*—Wolf, Greenfield & Sacks, P.C.

(57) ABSTRACT

In a disc cartridge, the shutter opening/closing operation is to be performed reliably. To this end, the distal ends of a first engagement member 75 and a second engagement member 79 provided to a base 66 are pivotally movable in a direction along a lateral surface of a housing 51, in addition to being movable in a direction perpendicular to the lateral surface of the housing 51. The state of engagement of the first engagement member 75 and the second engagement member 79, provided to the base, with a first mating engagement section 110 and with a second mating engagement section 108, provided to an inner rotor 101, facing outwards from one lateral surface of the housing 51, when the base 66 performs relative movement along the lateral surface of the housing 51, may be maintained for prolonged time, while the load applied to the distal ends during engagement and disengagement may be reduced.

10 Claims, 40 Drawing Sheets

U.S. PATENT DOCUMENTS

| | | |
|---|---|---|
| 6,766,817 B2 | 7/2004 | Silva |
| 6,813,236 B2 * | 11/2004 | Ezawa et al. ............ 369/249.1 |
| 6,898,795 B2 * | 5/2005 | Inoue ........................ 720/644 |
| 6,901,602 B2 * | 5/2005 | Inoue ........................ 720/742 |
| 6,911,595 B2 | 6/2005 | Yoshikawa et al. |
| 2002/0015881 A1 | 2/2002 | Nakamura |
| 2002/0031080 A1 | 3/2002 | Inoue |
| 2003/0183271 A1 | 10/2003 | Ikeda et al. |
| 2003/0235144 A1 * | 12/2003 | Eum et al. ................. 369/291 |
| 2004/0062175 A1 * | 4/2004 | Inoue ........................ 369/77.2 |
| 2004/0163100 A1 * | 8/2004 | Kawaguchi et al. ........ 720/741 |
| 2004/0251508 A1 | 12/2004 | Tomita |
| 2005/0218467 A1 | 10/2005 | Tomita |
| 2005/0224112 A1 | 10/2005 | Tokita et al. |
| 2005/0240948 A1 * | 10/2005 | Ezawa et al. ............... 720/643 |
| 2006/0048812 A1 | 3/2006 | Tomita |
| 2006/0084257 A1 | 4/2006 | Tokita |
| 2006/0107994 A1 | 5/2006 | Morooka et al. |
| 2006/0112988 A1 | 6/2006 | Morooka |
| 2006/0137739 A1 | 6/2006 | Imoto et al. |

FOREIGN PATENT DOCUMENTS

| | | |
|---|---|---|
| EP | 1 100 086 A2 | 5/2001 |
| EP | 1 152 418 A1 | 11/2001 |
| EP | 1 156 488 A2 | 11/2001 |
| EP | 1 431 971 A1 | 6/2004 |
| EP | 1542223 A1 * | 6/2005 |
| JP | 10-255863 A | 9/1998 |
| JP | 11-354169 A | 12/1999 |
| JP | 2000-106222 A | 4/2000 |
| JP | 2000-195569 A | 7/2000 |
| JP | 2000-231942 A | 8/2000 |
| JP | 2000-285975 A | 10/2000 |
| JP | 2001-93591 A | 4/2001 |
| JP | 2001-143771 A | 5/2001 |
| JP | 2001-253883 A | 9/2001 |
| JP | 2002-8740 A | 1/2002 |
| JP | 2002-8741 A | 1/2002 |
| JP | 2002-25635 A | 1/2002 |
| JP | 2002-175843 A | 6/2002 |
| JP | 2002-222971 A | 8/2002 |
| JP | 2002-289269 A | 10/2002 |
| JP | 2002-289274 A | 10/2002 |
| JP | 2002-319689 A | 10/2002 |
| JP | 2002-352868 A | 12/2002 |
| JP | 2002-352869 A | 12/2002 |
| JP | 2002-352870 A | 12/2002 |
| JP | 2002-353432 A | 12/2002 |
| JP | 2003115182 A * | 4/2003 |

OTHER PUBLICATIONS

Adachi, Motonari, "Dye-Sensitized Solar Cells Using Semiconductor Thin Film Composed of Titania Nanotubes," Electrochemistry, Jun. 2002, vol. 70, No. 6, pp. 449-452.

Adachi, Motonari, "Formation, Characterization, and Functions of Ceramic Nanotubes," Transactions of the Materials Research Society of Japan, Sep. 2002, vol. 27, No. 3, pp. 505-508.

Ngamsinlapasathian, S., "Titania Nanotube o Mochiiru Shikiso Zokan Taiyodenchi no Kokoritsuka," The Society of Chemical Engineers, Japan Dai 35 Kai Shuki Taikai Kenkyu Happyo Koen Yoshishu, Aug. 2002, p. 843.

Ngamsinlapasathian, S., "Higher Efficiency in Dye-Sensitized Solar Cells Using Titania Nanotube,"2002 Nen Denki Kagaku Shuki Taikai Koen Yoshishu, Sep. 2002, p. 138.

Adachi, M., "Formation of Titanium Oxide Nanotubes and Application to Dye-Sensitized Solar Cells," The Electrochemical Society of Japan Dai 68 Kai Taikai Koen Yoshishu, Mar. 2001, p. 112.

Murata, Y., The Synthetic Conditions of Titania Nanotubes Using Template of Molecular Assemblies, CSJ: The Chemical Society of Japan Dai 82 Shuki Nenkai Koen Yokoshu, Sep. 2002, p. 178.

E-mail for Silva, E ; "U.S. 20060107994—Requesting IDS of 6,766,817"; May 25, 2006.

E-mail from Silva, E ; "US 20050016578—Requesting IDS of 6,766,817"; May 25, 2006.

* cited by examiner

SHUTTER CLOSING MECHANISM AND DISC DRIVING APPARATUS

BACKGROUND OF THE INVENTION

1. Field of the Invention

This invention relates to a shutter opening/closing mechanism in which a shutter is opened/closed by rotating an inner rotor of a disc cartridge, and to a disc driving apparatus in which signals may be recorded and/or reproduced for a disc-shaped recording medium housed in a housing of such disc cartridge.

This application claims the priority of the Japanese Patent Application No. 2003-102345 filed on Apr. 4, 2003, the entirety of which is incorporated by reference herein.

2. Description of the Related Art

A disc driving apparatus for recording and/or reproducing signals for a disc-shaped recording medium, exemplified by an optical disc, such as CD (Compact Disc), DVD or MD, and a magneto-optical disc, is used extensively for recording and/or reproducing music or pictures. Additionally, this sort of the disc driving apparatus is used as a storage device for an information processing apparatus, such as a computer.

In the disc driving apparatus, a disc-shaped recording medium is first set on a tray, and then the tray is pulled from a pull-out position to a recording and/or reproducing position. In this state, a turntable is uplifted from a lower position to float the disc-shaped recording medium from the tray. The recording medium is then run in rotation, at the same time as an optical pickup is moved radially of the recording medium, in order to record and/or reproduce the signals.

Meanwhile, a disc-shaped recording medium, recorded to a high density, such as BD (Blue-ray Disk), is used as a disc cartridge, accommodated in a housing, in order to prevent contamination e.g. with dust. For this reason, the disc cartridge is designed and constructed so that an aperture for recording and/or reproduction formed in the housing is closed by a shutter during non-use time, with the shutter opening the aperture during recording and/or reproduction to enable accessing by the optical head.

Thus, in a disc driving apparatus for recording and/or reproducing signals for such disc cartridge, it is desirable that the shutter completely opens the aperture in timed relation to the loading of the disc cartridge in the recording or reproducing position. That is, the aperture must be opened in a satisfactory manner even in case the state of closure by the shutter is incomplete. On the other hand, when the disc cartridge is taken out after the end of the recording or reproducing operation, the aperture in the housing must be positively closed by the shutter.

SUMMARY OF THE INVENTION

It is therefore an object of the present invention to provide a shutter opening/closing mechanism in which the shutter opening/closing operation may be performed reliably. It is another object of the present invention to provide a disc driving apparatus provided with the shutter opening/closing mechanism whereby it is possible to assure a reliable shutter opening/closing operation and to record and/or reproduce signals reliably for the disc-shaped recording medium housed in the disc cartridge.

In one aspect, the present invention provides a shutter opening/closing mechanism of the type coping with a disc cartridge in which a disc-shaped recording medium, an inner rotor and a shutter are provided in a housing and in which an aperture formed in said housing is opened or closed by said shutter by rotation of said inner rotor, wherein the shutter opening/closing mechanism opens/closes the shutter by rotation of the inner rotor, and comprises a base relatively movable along one lateral surface of the housing, a first engagement member provided to one end of the base for engaging with a first mating engagement section provided to the outer rim of the inner rotor facing outwards from a lateral side of the housing when the shutter is closed, a second engagement member provided to the other end of the base for engaging with a second mating engagement section provided to the outer rim of the inner rotor facing outwards from a lateral side of the housing when the shutter is opened, and a rack member mounted between the first engagement member and the second engagement member of the base for meshing with a gear provided in a preset area of the outer rim between the first mating engagement section and the second mating engagement section of the inner rotor. The first engagement member and the second engagement member are mounted to the base so that the distal ends thereof are movable in a direction perpendicular to the direction along one lateral surface of the housing and pivotable along one lateral surface of the housing.

In the shutter opening/closing mechanism, according to the present invention, the distal ends of the first engagement member and the second engagement member, provided to the base, are pivotable in a direction along a lateral surface of the housing, in addition to being movable in a direction perpendicular to the lateral surface of the housing. Thus, the state of engagement of the first engagement member and the second engagement member, provided to the base, with the first mating engagement section and the second mating engagement section of the inner rotor, facing outwards from one lateral surface of the housing, when the base performs relative movement along the lateral surface of the housing, may be maintained for prolonged time. In addition, the load applied to the distal ends during engagement and disengagement may be reduced.

In another one aspect, the present invention provides a disc driving apparatus of the type coping with a disc cartridge in which a disc-shaped recording medium, an inner rotor and a shutter are provided in a housing and in which an aperture formed in the housing is opened or closed by the shutter by rotation of the inner rotor, wherein the disc driving apparatus records and/or reproduces signals on or from the disc-shaped recording medium, and comprises a loading mechanism for causing movement of the disc cartridge between a pull-out position in which the disc cartridge is pulled out to outside a main body unit of the apparatus and a housed position in which the disc cartridge is housed within the main body unit of the apparatus, and a shutter opening/closing mechanism for opening/closing the shutter by rotating the inner rotor of the disc cartridge moved by the loading mechanism between the pull-out position and the housed position to effect opening/closure of the shutter. The shutter opening/closing mechanism includes a base relatively movable along one lateral surface of the housing, a first engagement member provided to one end of the base for engaging with a first mating engagement section provided to the outer rim of the inner rotor facing outwards from a lateral side of the housing when the shutter is closed, a second engagement member provided to the other end of the base for engaging with a second mating engagement section provided to the outer rim of the inner rotor facing outwards from the lateral side of the housing when the shutter is opened, and a rack member mounted between the first engagement member and the second engagement member of the base for meshing with a gear provided in a preset area of the outer rim between the first mating engagement section and the second mating engagement section of the inner rotor. The first engagement member and the second engagement member are mounted to the base so that the distal ends thereof are movable in a direction perpendicular to the direction along the lateral surface of the housing and pivotable along the lateral surface of the housing.

In the disc driving apparatus, according to the present invention, the distal ends of the first engagement member and the second engagement member, provided to the base, are pivotable in a direction along a lateral surface of the housing, in addition to being movable in a direction perpendicular to the lateral surface of the housing. Thus, the state of engagement of the first engagement member and the second engagement member, provided to the base, with the first mating engagement section and the second mating engagement section of the inner rotor, facing outwards from one lateral surface of the housing, when the base performs relative movement along the lateral surface of the housing, may be maintained for prolonged time. In addition, the load applied to the distal ends during engagement and disengagement may be reduced.

According to the present invention, described above, the distal ends of the first engagement member and the second engagement member, provided to the base, are pivotable in a direction along a lateral surface of the housing, in addition to being movable in a direction perpendicular to the lateral surface of the housing. Thus, the state of engagement of the first engagement member and the second engagement member, provided to the base, with the first mating engagement section and the second mating engagement section of the inner rotor, facing outwards from one lateral surface of the housing, when the base performs relative movement along the lateral surface of the housing, may be maintained for prolonged time. In addition, the load applied to the distal ends during engagement and disengagement may be reduced, so that highly reliable shutter opening/closing operations may be achieved.

DESCRIPTION OF THE PREFERRED EMBODIMENTS

Figure 1:
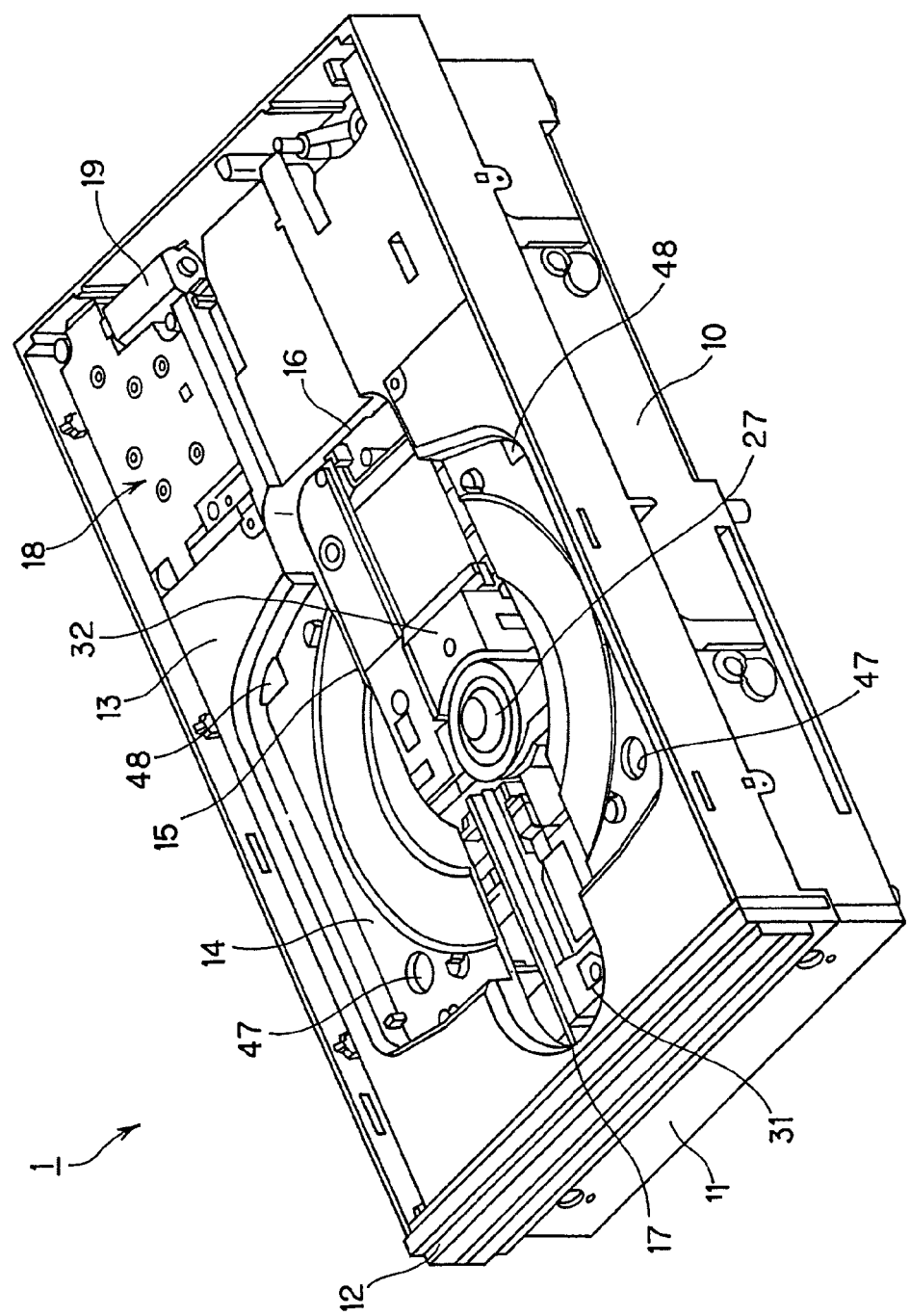
FIG. 1 is a perspective view showing the structure of a disc driving apparatus embodying the present invention.

Referring to the drawings, a shutter opening/closing mechanism and a disc driving apparatus, embodying the present invention, are now explained in detail.

Figure 2:
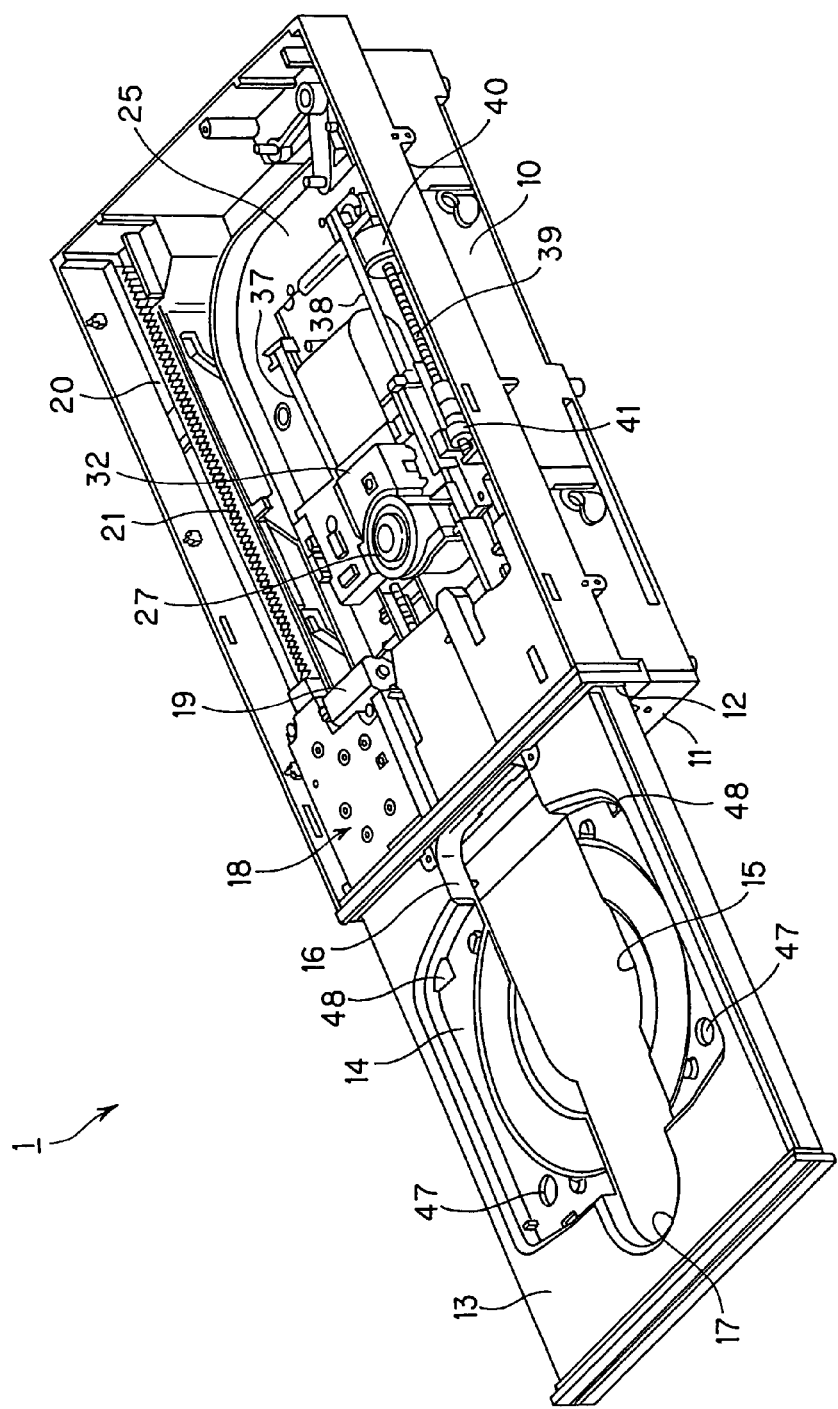
FIG. 2 is a perspective view showing the state in which a tray of the disc driving apparatus has been pulled out.
Figure 3:
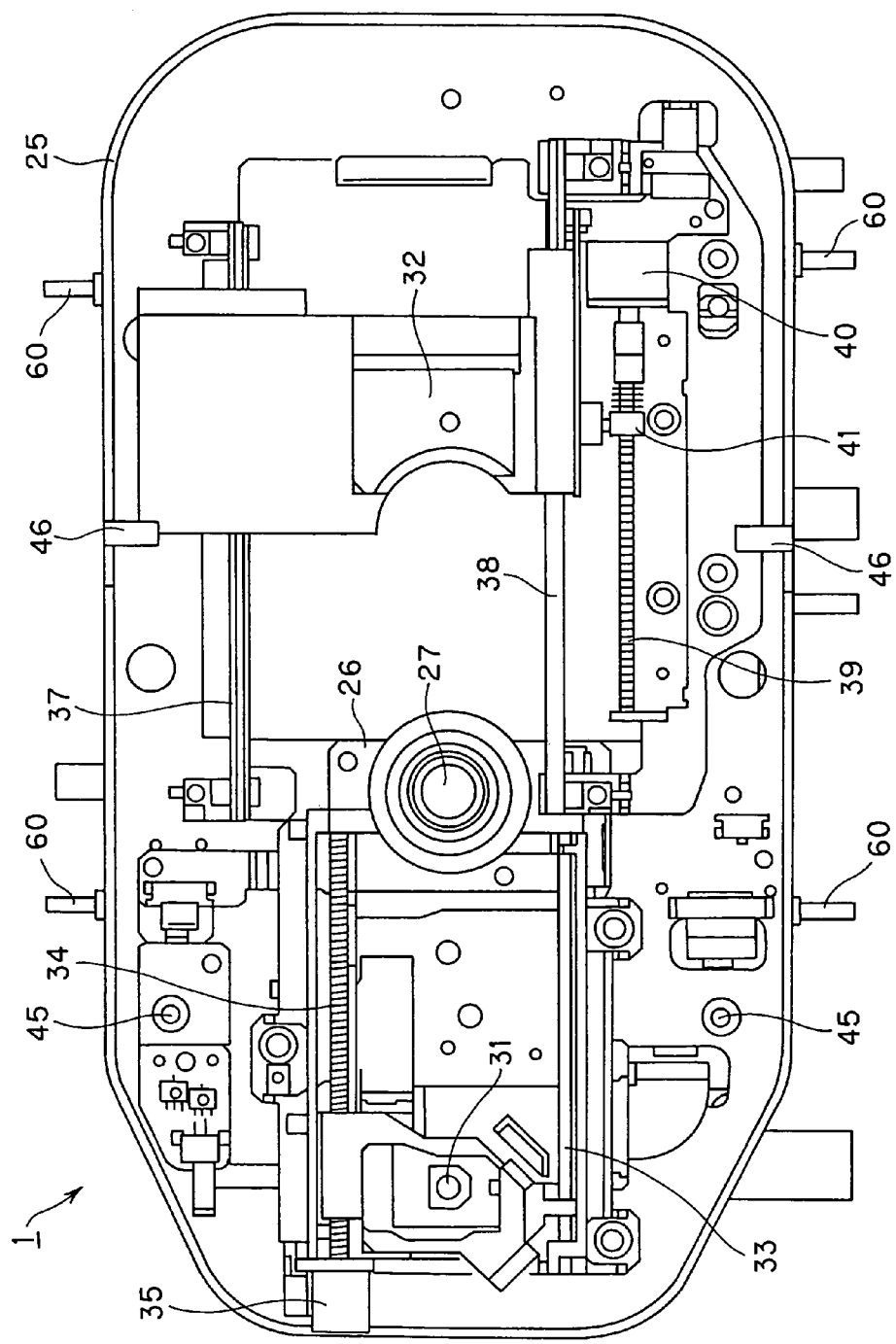
FIG. 3 is a plan view of a base unit forming the disc driving apparatus.
Figure 4:
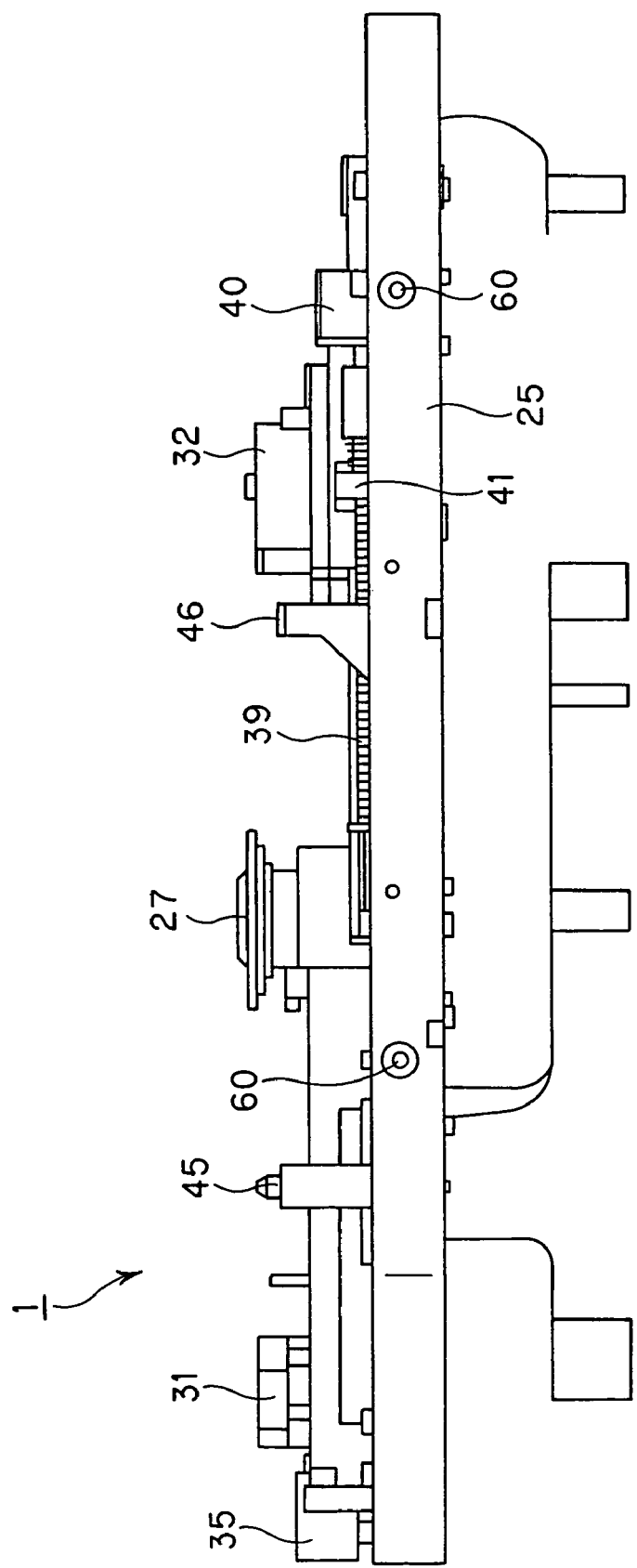
FIG. 4 is a side view of the base unit forming the disc driving apparatus.
Figure 5:
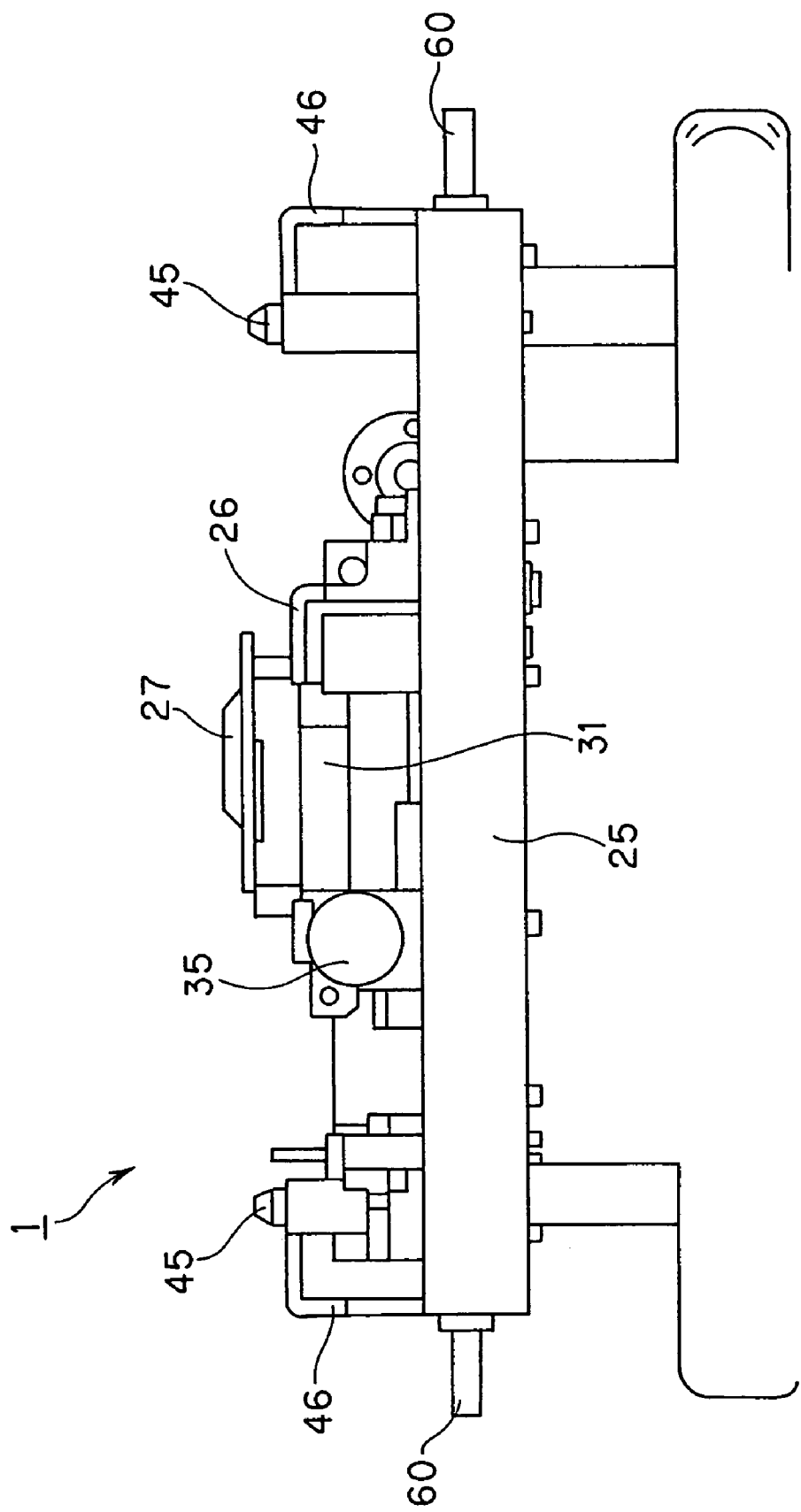
FIG. 5 is a front view of the base unit forming the disc driving apparatus.
Figure 6:
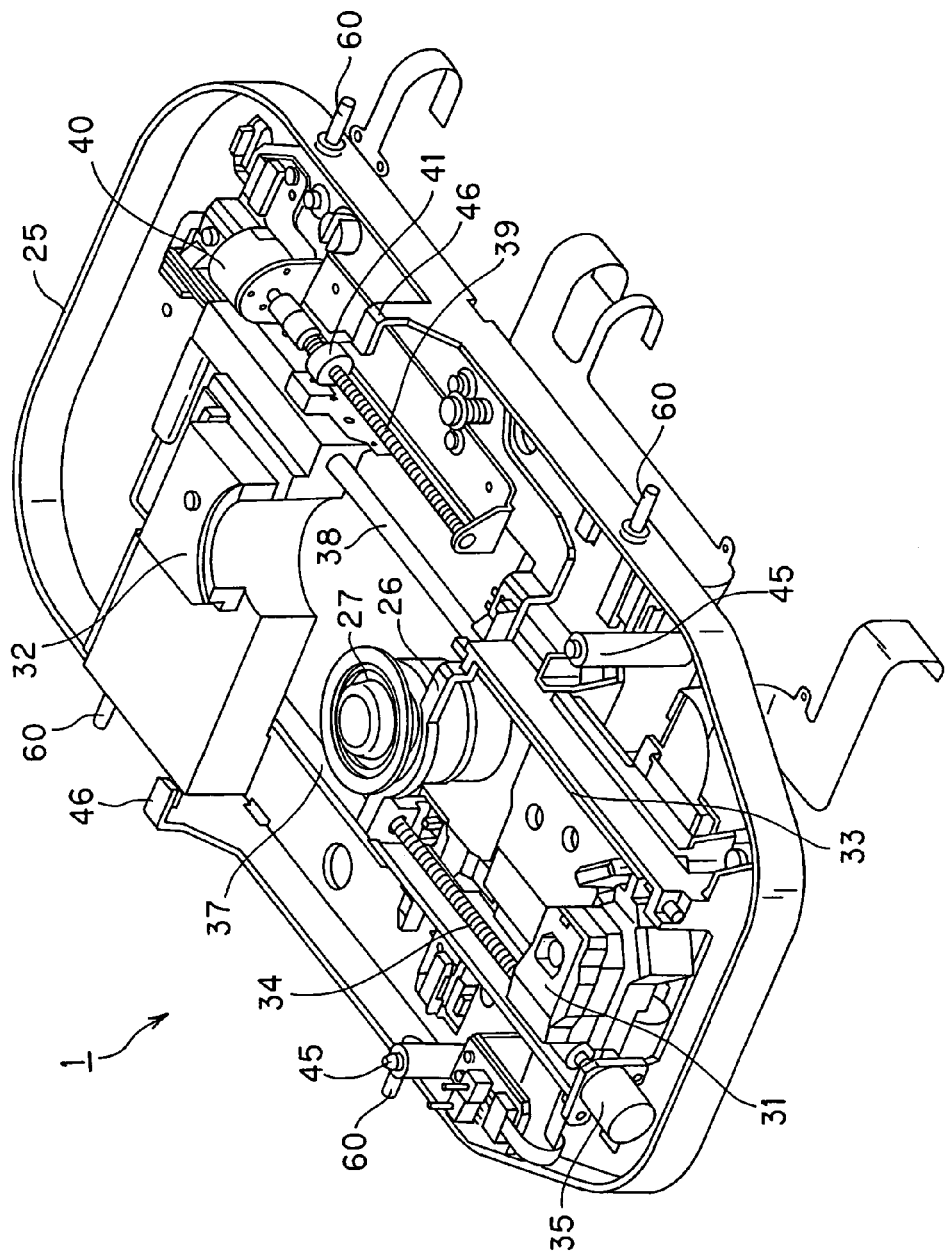
FIG. 6 is a perspective view of the base unit forming the disc driving apparatus.

The disc driving apparatus, shown in FIGS. 1 and 2, is a recording and/or reproducing apparatus capable of using two of plural sorts of the disc-shaped recording mediums of reciprocally incompatible formats, such as DVD, CD or BD.

This disc driving apparatus 1 includes a flat parallelepipedically-shaped outer casing 10. Meanwhile, the upper part of the outer casing 10 of the disc driving apparatus 1, shown in FIGS. 1 and 2, is shown opened. A front panel 11, closing the front side opening of the outer casing 10, includes a horizontally elongated aperture 12, through which a tray 13 is mounted in the outer casing 10 so that the tray may be pulled outwards.

The tray 13 includes a holder 14 at a mid portion thereof for holding a disc cartridge or a bare disc. The tray 13 is also formed with an opening 15 for extending in the longitudinal direction as traversing the holder 14. A U-shaped incision 16 is formed in conjunction to a recessed side of the opening 15, whilst a semicircular incision 17 is formed in conjunction to the near side of the opening 15.

On a lateral side of the recessed part of the tray 13, there are mounted a driving unit 18 making up the loading mechanism and a motor 19 for driving the driving unit 18. The tray 13 is slidably carried by a pair of steps 20 formed on both inner lateral sides of the outer casing 10, while a pinion forming an output end of the driving unit 18 meshes with a lower rack 21 of the step 20. In this manner, the tray 13 is movable between a pullout position in which the tray is pulled out to outside the main body unit of the apparatus via the horizontally elongated aperture 12 and a housed position in which the tray is housed within the main body unit of the apparatus.

On the top of the bottom plate of the outer casing 10 is mounted a base unit 25, as shown in FIGS. 3 to 6. This base unit 25 is formed by a chassis formed by a metal plate or resin and a turntable 27 forming a rotation driving unit is provided via a bracket 26. This turntable 27 is run in rotation by being mounted to an output shaft of a driving motor provided therebelow.

The base unit 25 is provided with an optical pickup for DVD/CD 31 and an optical pickup for BD 32, on the near side and on the recessed side with respect to the turntable 27, respectively.

Of these, the optical pickup for DVD/CD 31 has its both lateral sides supported by a guide rod 33 and a feed screw 34, and is displaced along the radius of the optical disc by the feed screw 34 being rotationally driven by a stepping motor 35.

The optical pickup for BD 32 is carried for sliding movement along the radius of the optical disc by a pair of guide rods 37, 38. The base unit 25 is provided with a feed screw 39 and a stepping motor 40 for rotationally driving the feed screw 39. When the feed screw 39 is rotationally driven by the stepping motor 40, the optical pickup 32 for BD is displaced along the radius of the optical disc in unison with a nut 41 threaded to the feed screw 39.

Thus, in the disc driving apparatus 1, the turntable 27 is used in common, and the optical pickup for DVD/CD 31 and the optical pickup for BD 32 are arranged on the near side and on the recessed side with respect to this turntable 27. These two optical pickups 31, 32 are movable radially of the optical disc in 180° circumferentially offset positions on both sides of the turntable 27. In particular, the optical pickup for BD 32, as an optical pickup for a high density recording format vulnerable against dust apt to be intruded into the apparatus, is arranged on the recessed side on the base unit 25 as a countermeasure against dust.

The guide rods 37, 38 for movement of the optical pickup for BD 32 are provided so that the optical pickup for BD 32 will not impinge against a bare disc 52 composed of a DVD/CD but will be moved to the opposite plane side of the turntable 27, in case the bare disc 52 is used. These guide rods 37, 38, which are components needed for the optical pickup for BD 32 to access a cartridge for BD 51 to cause radial movement of the optical pickup for BD 32 with respect to the optical disc in the cartridge, are only slightly elongated to serve as a retreating mechanism for the optical pickup for BD 32.

On the other hand, the guide rod 33 and the feed screw 34 are elongated so that the optical pickup for DVD/CD 31 will not impinge against the cartridge for BD 51 but will be moved to the opposite outer rim side of the turntable 27, in case of using the cartridge for BD 51. The guide rod 33 and the feed screw 34, which are components needed for the optical pickup for DVD/CD 31 to access the bare disc 52, are only slightly elongated to enable a receding movement of the optical pickup for DVD/CD 31.

Meanwhile, the optical pickups 31, 32 may be adjusted for tilt and positioning independently of each other. At least one of the main shafts or the sub-shafts of the guide rods 33, 37, 38, adapted for slidably supporting the two optical pickups 31, 32 may be used in common to reduce the number of the component parts.

In the present embodiment, the optical pickups 31, 32 are arranged on the near side and on the recessed side of the base unit 25 in a diametrically opposite relationship, that is, at the positions 180° offset relative to the circumferential direction of the turntable 27. However, the optical pickups 31, 32 do not necessarily have to be disposed in the 180° offset positions. That is, the optical pickups 31, 32 may be arranged for movement in 90° offset positions or at an optional angle, e.g. 60° of intersection of the movement directions. That is, the direction of the movements of the optical pickups 31, 32 may be optionally selected in relation to the arrangement of the outer casing 10 or the other component parts in the base unit 25.

A pair of support rods 45 and another pair of support rods 46 are mounted upright on both forwards sides and on both rearward sides of the base unit 25, respectively. When the base unit 25 is uplifted by a lift mechanism, the support rods 45, 46 are protruded from openings 47, 48 formed in the tray 13, in order to support the cartridge for BD 51, retained by the holder 14 of the tray 13, at the four corners from the underside of the cartridge for BD 51.

Figure 7:
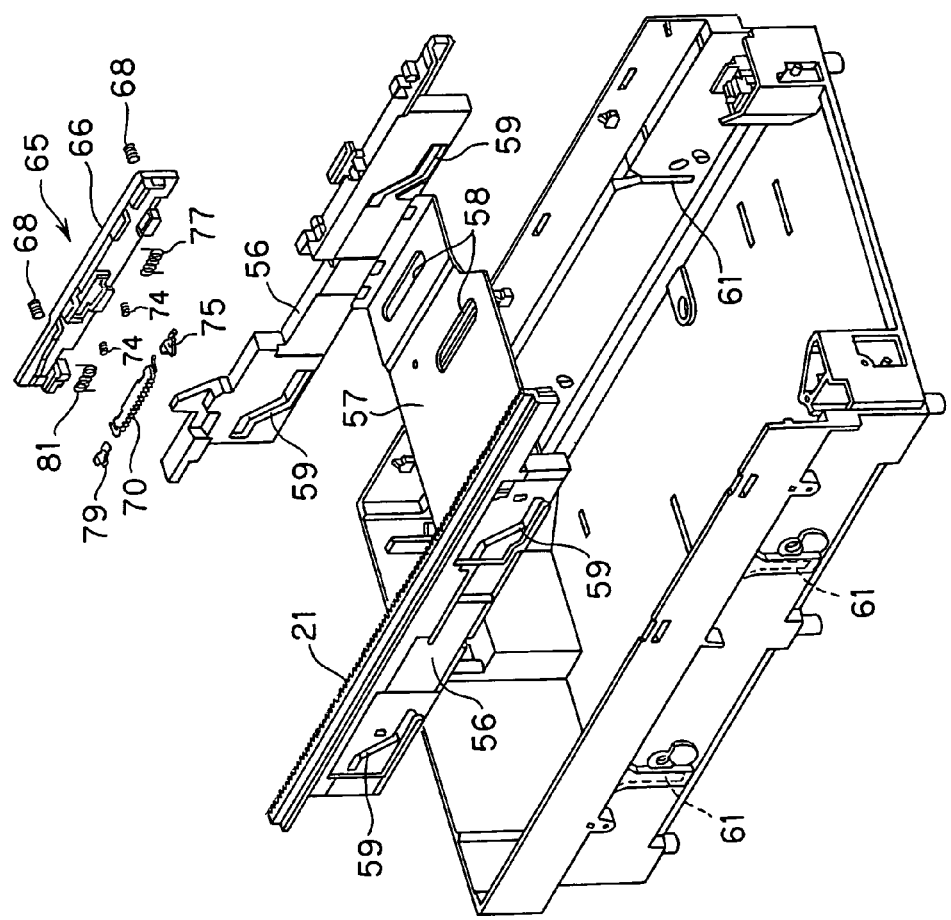
FIG. 7 is an exploded perspective view showing the mounting state of paired chuck sliders of the disc driving apparatus.

The disc driving apparatus 1 is provided with a pair of chuck sliders 56 on the bottom plate of the outer casing 10, as shown in FIG. 7. These two chuck sliders 56 are located inwardly of both side plates of the outer casing 10 and interconnected by a coupling plate 57. The coupling plate 57 is formed with elongated openings 58. The chuck sliders 56 are slidable in the fore-and-aft direction by set screws, not shown, tightened on the bottom plate of the outer casing 10, passing through the elongated openings 58 formed in the coupling plate 57.

The chuck sliders 56 are each formed with a pair of cam grooves 59 adapted for accommodating pins 60 provided to the lateral sides of the base unit 25. The distal ends of the pins 60 are engaged in vertical grooves 61 formed in the inner surface of the outer casing 10. Thus, when the two chuck sliders 56 are slid in the fore-and-aft direction, the base unit 25 performs an up-and down movement.

On the inner side of one of the chuck sliders 56 is formed a rack 21 forming the loading mechanism described above. This rack 21 meshes with a pinion forming an output end of the driving unit 18 of the tray 13. This enables the tray 13 to be movable between a pull-put position in which the tray is pulled out from the main body unit of the apparatus and a housed position in which the tray is housed within the main body unit of the apparatus, as the tray is slid by the driving operation of the motor 19.

Figure 8:
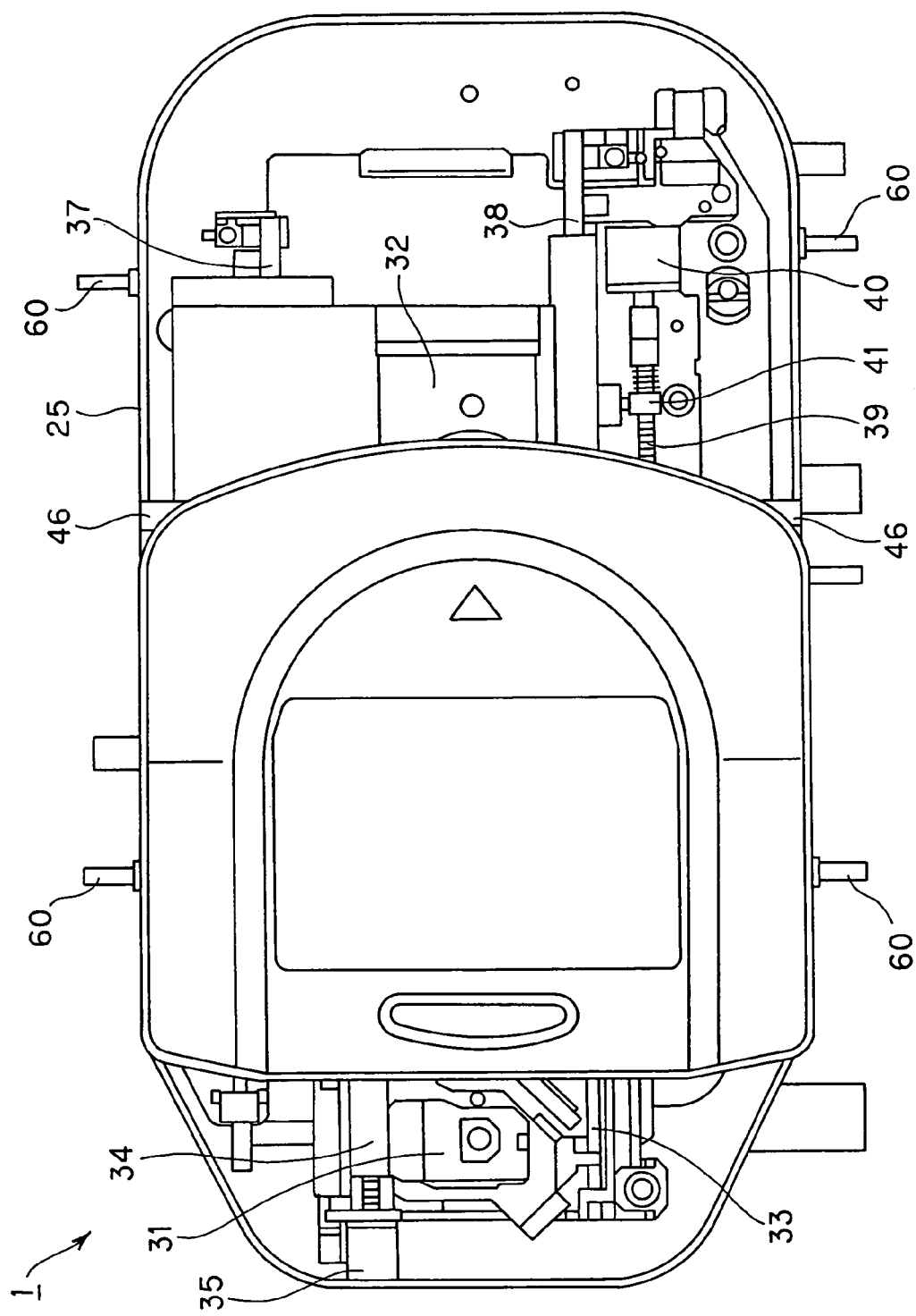
FIG. 8 is a plan view showing the state in which a cartridge for BD is loaded on a base unit of the disc driving apparatus.
Figure 9:
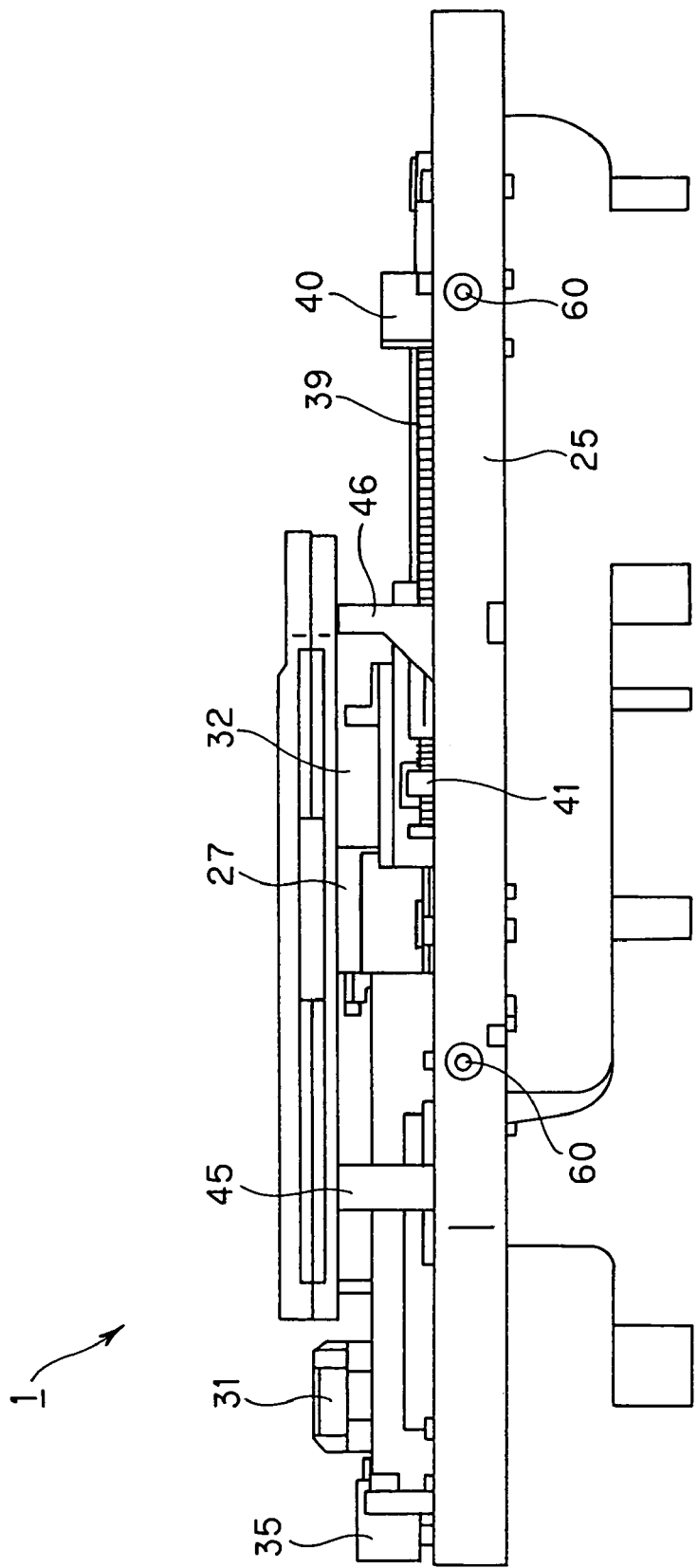
FIG. 9 is a side view showing the state in which the cartridge for BD is loaded on the base unit of the disc driving apparatus.
Figure 10:
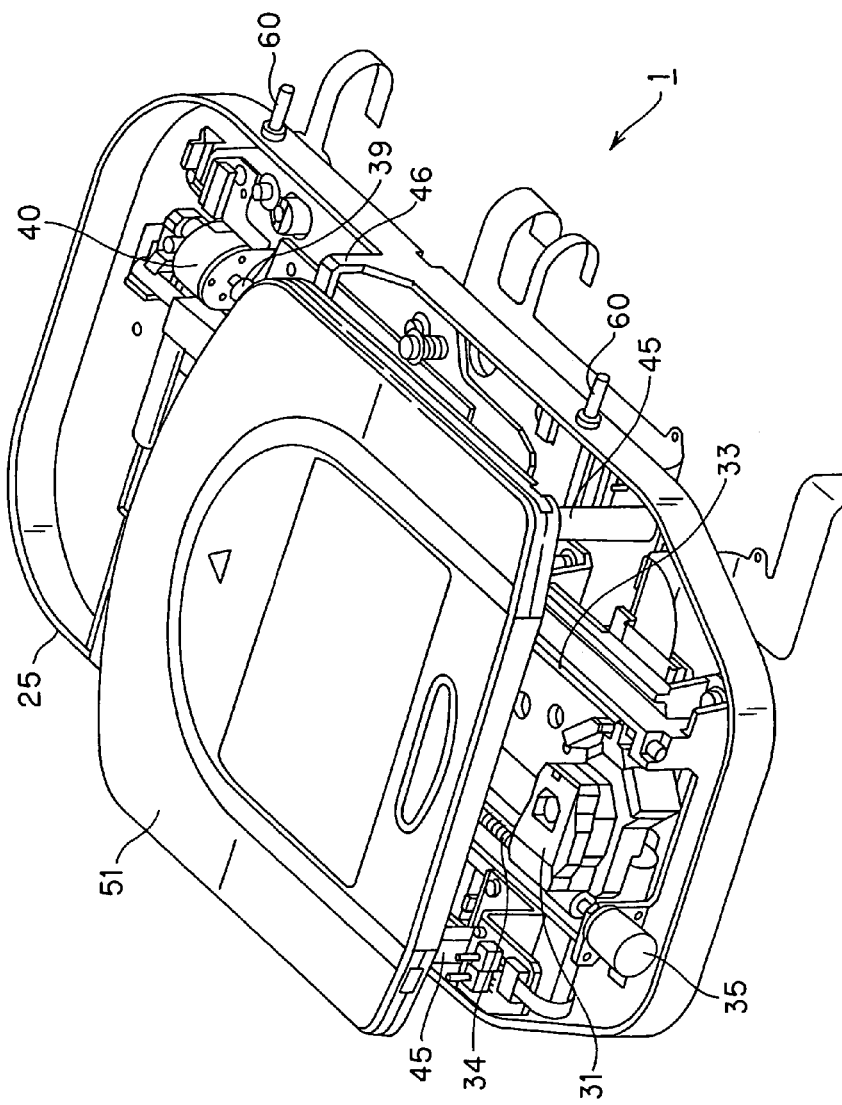
FIG. 10 is a perspective view showing the state in which the cartridge for BD is loaded on the base unit of the disc driving apparatus.

In the above-described disc driving apparatus 1, the cartridge for BD 51 is loaded within the main body unit of the apparatus, by the cartridge for BD 51 being set on the holder 14 of the tray 13 and by the tray 13 being pulled into the outer casing 10 by the operation of the loading mechanism, as shown in FIGS. 8 to 10.

The cartridge for BD 51 is carried at this time by the paired support rods 45, 46 on the base unit 25. As the base unit 25 is uplifted, the rods 45 and the arms 46 are caused to face the holder 14 of the tray 13 through the openings 47, 48 formed in the tray 13, for correctly positioning the cartridge for BD 51. The optical pickup for DVD/CD 31 is retreated in the forward portion of the tray 13, located on the outer rim side of the cartridge for BD 51, by the stepping motor 35 and the feed screw 34. Additionally, with the cartridge for BD 51, an aperture 91 has been opened by shutter members 100 of a shutter opening/closing mechanism 65 which will be explained subsequently.

In this state, the disc housed in the cartridge for BD 51 is rotationally driven by the turntable 27 to record and/or reproduce the information on or from the disc as the optical pickup for BD 32 is moved radially of the disc.

Figure 11:
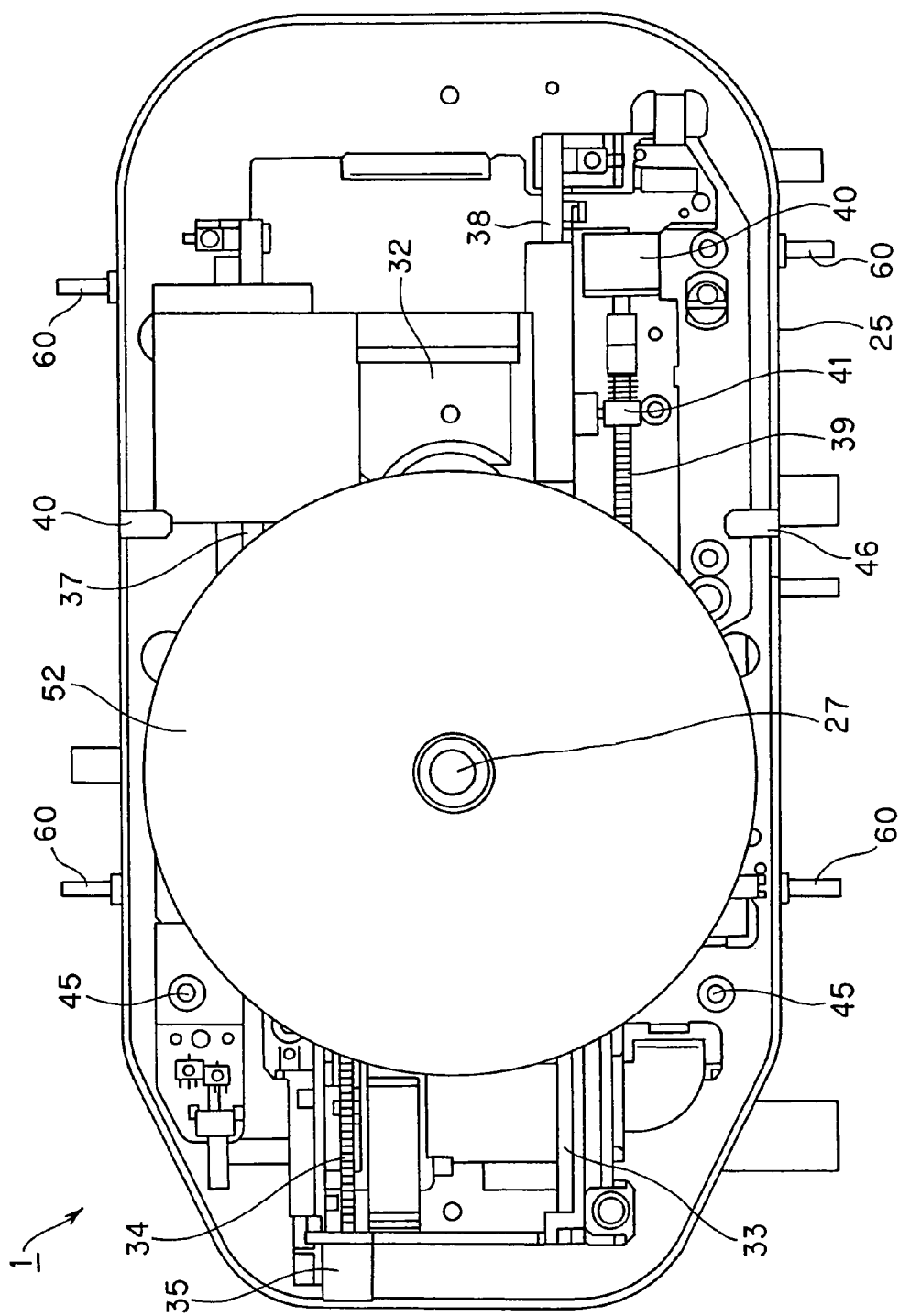
FIG. 11 is a plan view showing the state in which a bare disc is loaded on the base unit of the disc driving apparatus.
Figure 12:
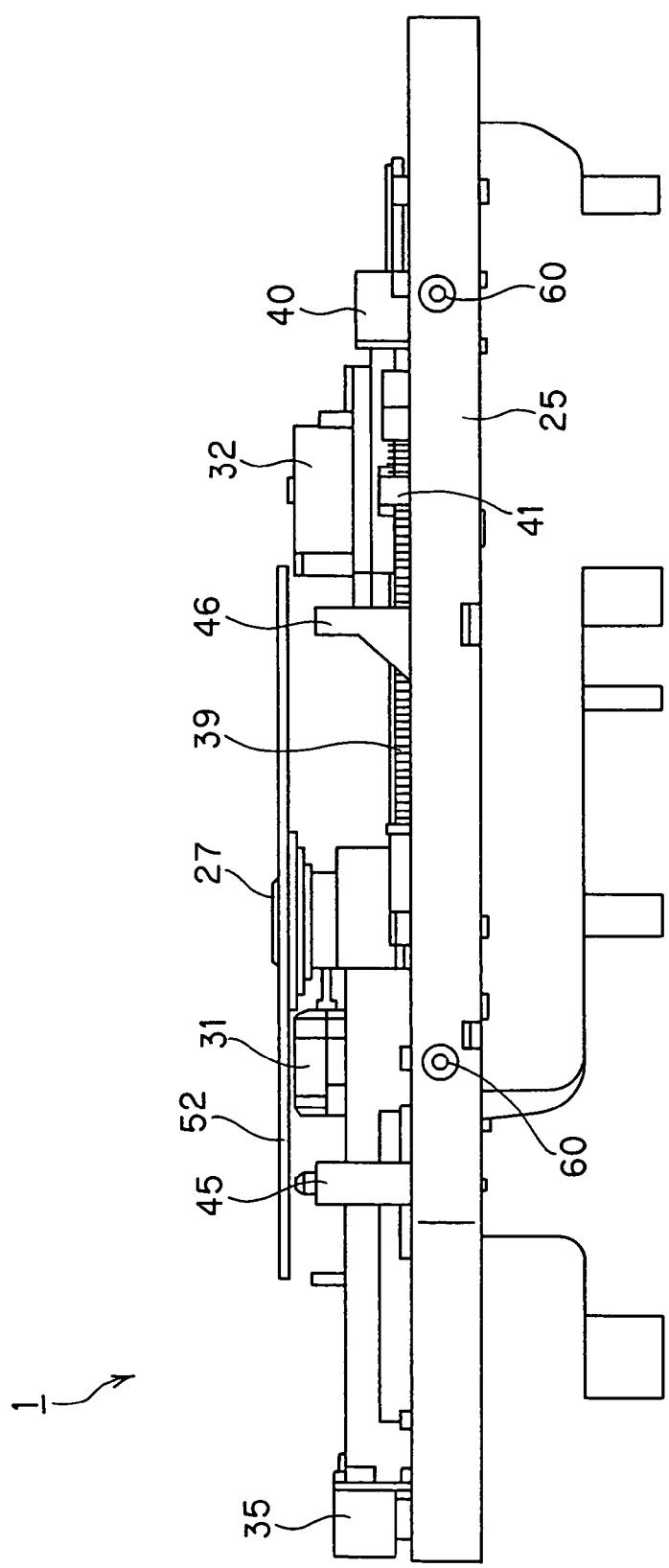
FIG. 12 is a side view showing the state in which a bare disc is loaded on the base unit of the disc driving apparatus.
Figure 13:
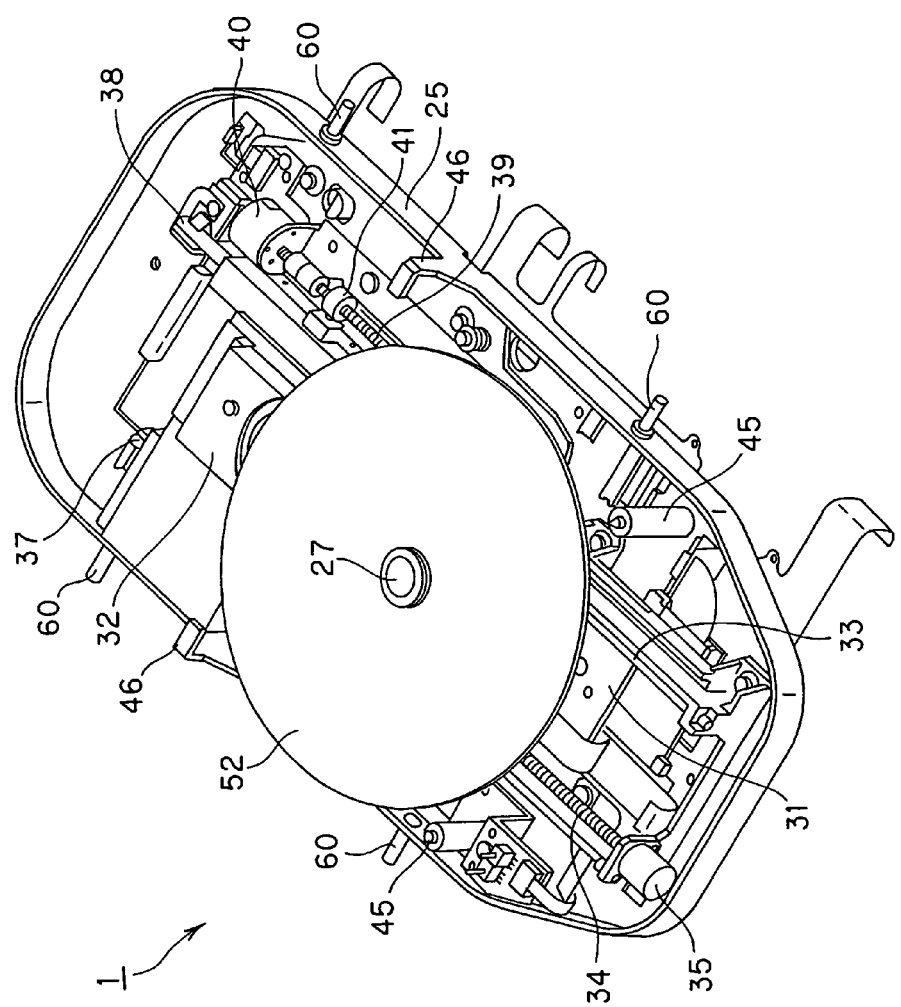
FIG. 13 is a perspective view showing the state in which a bare disc is loaded on the base unit of the disc driving apparatus.

When the bare disc 52 is set on the holder 14 of the tray 13, and the tray 13 is pulled into the inside of the outer casing 10 by the loading mechanism, the bare disc 52 is loaded in the inside of the main body unit of the apparatus, as shown in FIGS. 11 to 13.

The optical pickup for BD 3 is retreated at this time to a rear side of the tray 13, on the outer side of the outer rim of the cartridge for BD 51, by the stepping motor 40 and the feed screw 39.

In this state, the bare disc 52 is run in rotation by the turntable 27, and the optical pickup for DVD/CD 31 is moved radially of the bare disc 52, to record and/or reproduce the information on or from the disc.

Meanwhile, the disc driving apparatus 1 is provided with the shutter opening/closing mechanism 65 for opening/closing a shutter provided to the cartridge for BD 51, as shown in FIG. 7.

Figure 14:
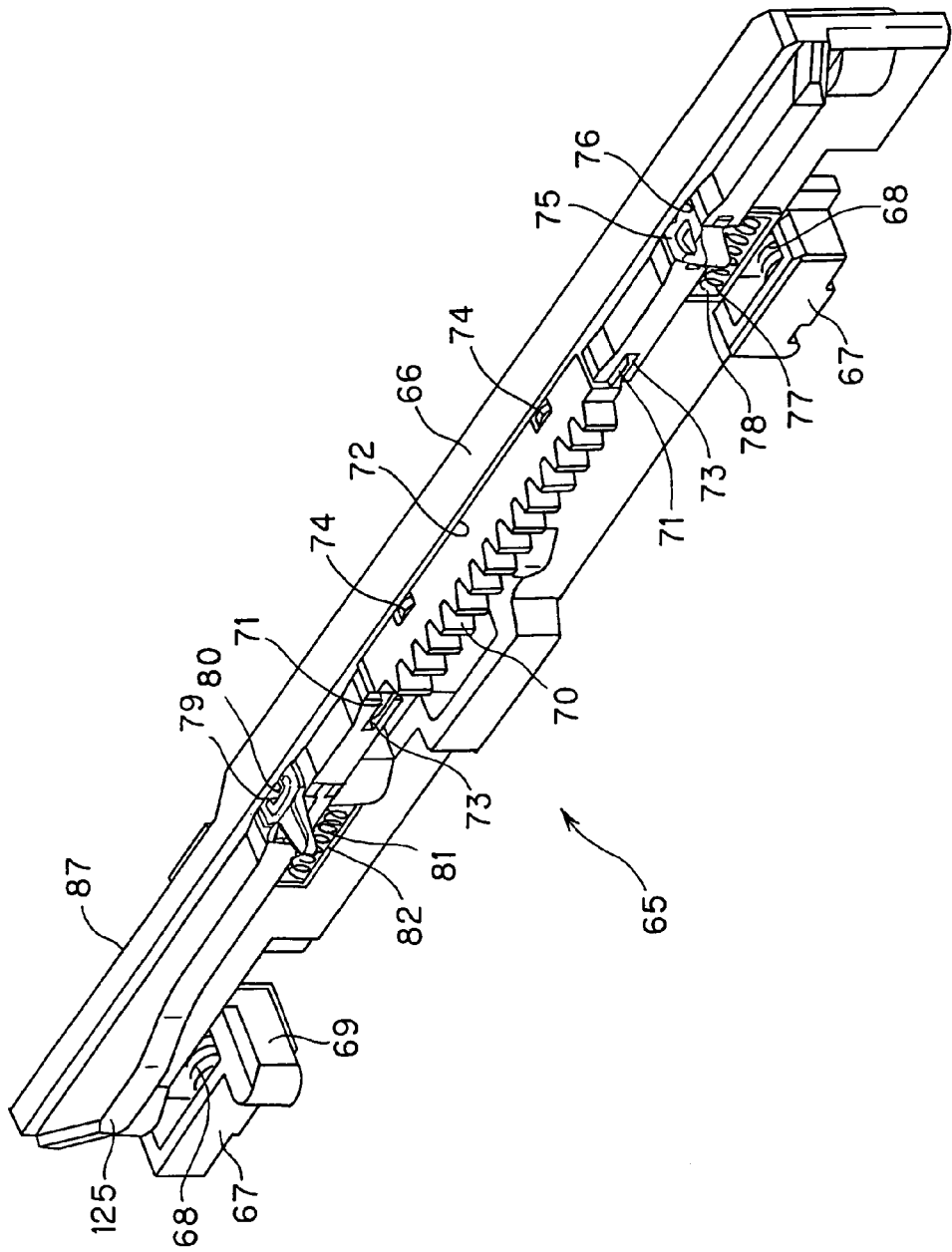
FIG. 14 is a perspective view showing the appearance of a shutter opening/closing mechanism embodying the present invention.
Figure 15:
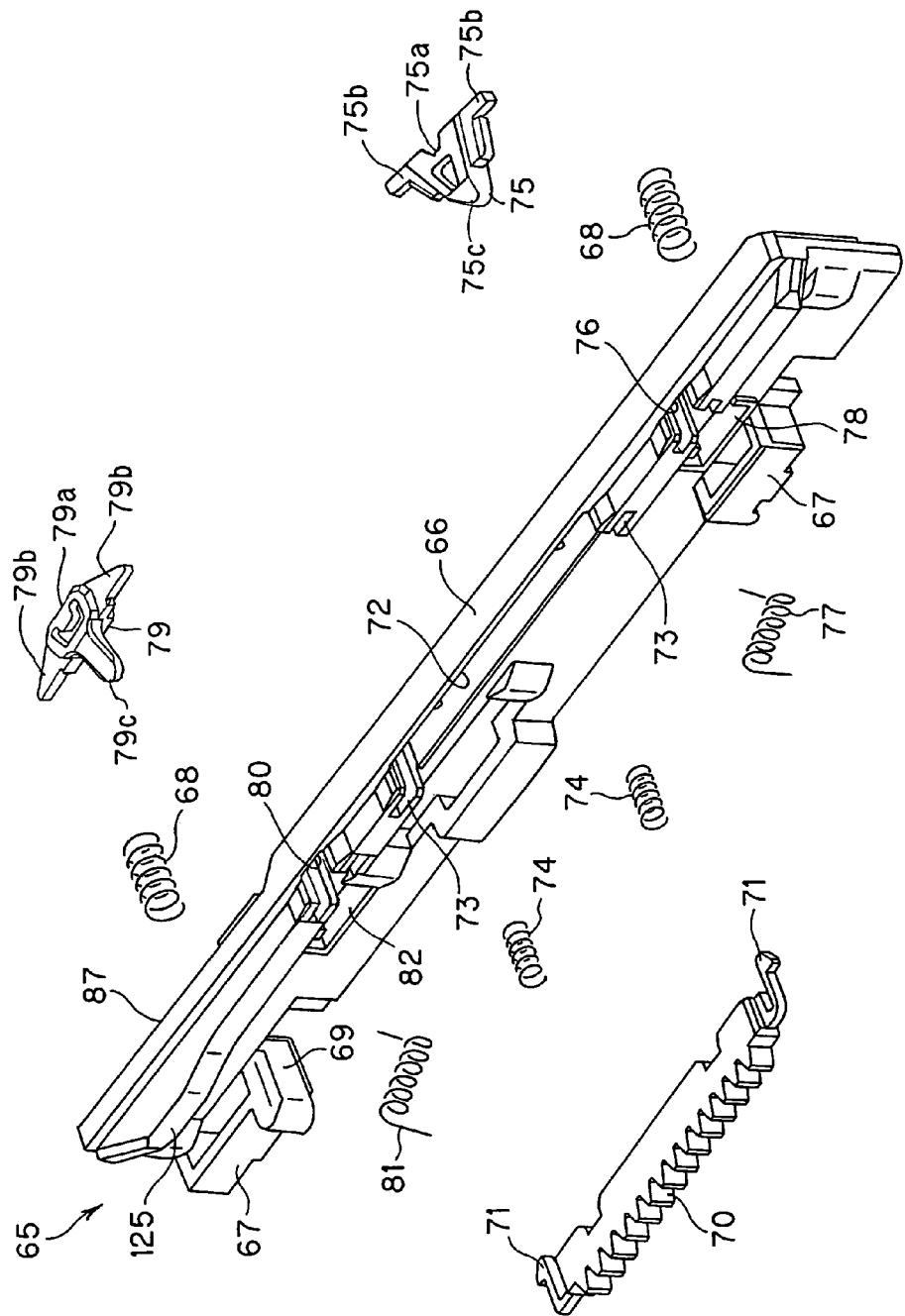
FIG. 15 is an exploded perspective view showing the structure of the shutter opening/closing mechanism.
Figure 16:
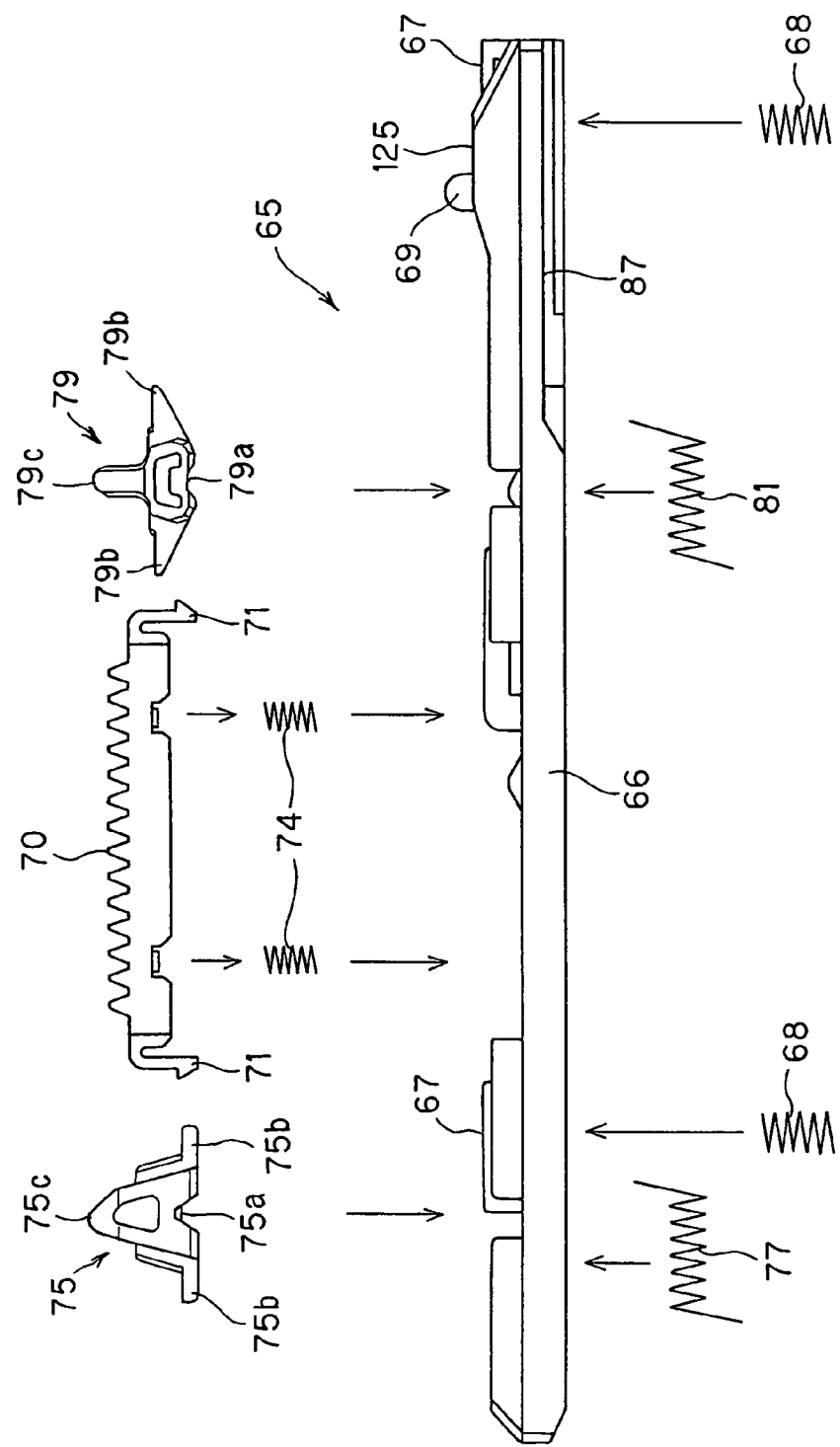
FIG. 16 is an exploded plan view showing the structure of the shutter opening/closing mechanism.

This shutter opening/closing mechanism 65 includes an opening/closure base 66, and a pair of holders 67 are provided to the longitudinal ends of the opening/closure base 66, as shown in FIGS. 14 to 16. Each of the holders 67 holds a spring 68 for biasing the opening/closure base 66 in a direction away from the associated chuck slider 56. One end of the opening/closure base 66 is provided with a boss 69 for retreating the shutter opening/closing mechanism 65.

A rack member 70 is mounted to a longitudinal mid portion of the opening/closure base 66. A pair of engagement pawls 71 are provided to the longitudinal ends of the rack member 70. The opening/closure base 66 includes a holding hole 72 for holding the rack member 70 and a pair of engagement openings 73 on both ends of the holding hole 72. The rack member 70 is held in the holding hole 72 by the paired engagement pawls 71 engaging in the paired engagement openings 73. A pair of coil springs 74, operating as biasing means, are arranged between the rack member 70 and the holding hole 72. Thus, the rack member 70 is biased by the paired coil springs 74 in a direction protruding from the holding hole 72, and may be pushed into the holding hole 72, as shown in FIG. 17.

A first engagement member 75 is mounted to the longitudinal forward side of the opening/closure base 66, as shown in FIGS. 14 to 16. This first engagement member 75 is of a pivot-like shape, with an angled distal end, and includes a cut-out 75a at a mid portion of the distal side and a pair of engagement lugs 75b at both ends of the distal side. The opening/closure base 66 is formed with a holding opening 76 for holding the first engagement member 75. A first torsion coil spring 77 for biasing the first engagement member 75 in a direction protruding from the holding opening 76 is arranged on the longitudinal forward side of the opening/closure base 66.

The first torsion coil spring 77 has a coiled part of a wire retained by a holder 78 provided to the opening/closure base 66, while having one of both ends of the coiled part of the wire retained by the opening/closure base 66 and having the other end engaged with the cut-out 75a of the first engagement member 75.

Figure 17:
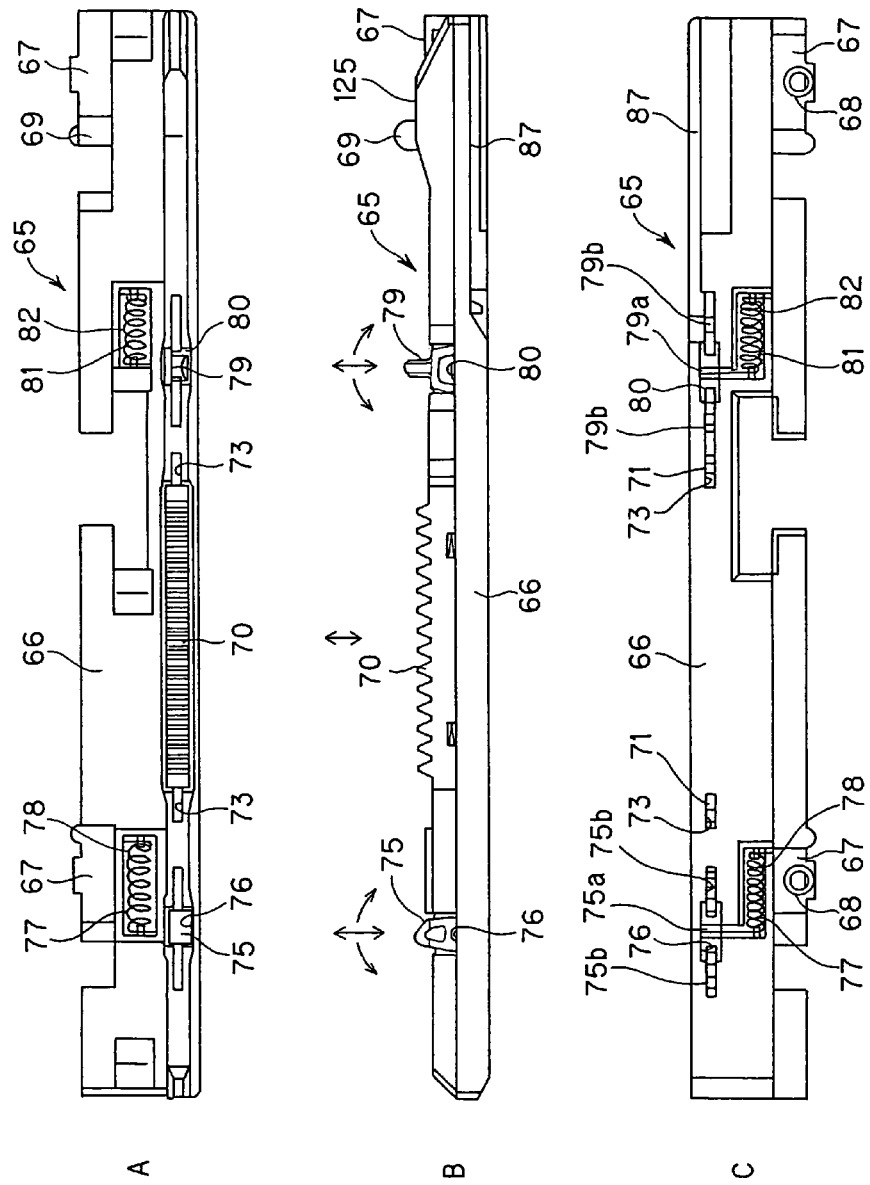
FIGS. 17A, 17B and 17C are a front view, a bottom plan view and a back side view of the structure of the shutter opening/closing mechanism.

Thus, the first engagement member 75 is mounted to the opening/closure base 66, in such a state that, as a distal end 75c thereof is protruded from the holding opening 76, the paired engagement lugs 75b are engaged in the holding opening 76, and the proximal end thereof is carried in a biased state by the other end of the first torsion coil spring 77, so that the distal end 75c is movable in a direction at right angles to the direction along the lateral surface of a housing and also pivotally moved in the direction along the lateral surface of the housing, as later explained, as shown in FIG. 17. That is, this first engagement member 75 is biased by the first torsion coil spring 77 in a direction protruding from the holding opening 76 and may be pushed into the inside of the holding opening 76 against this bias force. Moreover, the distal end 75c of the first engagement member 75 may be pivotally moved along the longitudinal direction of the opening/closure base 66. The distal end 75c of the first engagement member 75 is inclined to provide for facilitated disengagement of the inner rotor 10 from a mating engagement section 110 when the cartridge for BD 51 is pulled out from the main body unit of the apparatus, as will be explained subsequently.

On the rear end of the opening/closure base 66 is mounted a second engagement member 79, as shown in FIGS. 14 to 16. This second engagement member 79 is of a pivot-like shape, with an angled distal end, and includes a cut-out 79a at a mid portion of the distal side and a pair of engagement lugs 79b at both ends of the distal side. The opening/closure base 66 is formed with a holding opening 80 for holding the second engagement member 79. A second torsion coil spring 81 for biasing the second engagement member 79 in a direction protruding from the holding opening 80 is arranged on the longitudinal rearward side of the opening/closure base 66.

The second torsion coil spring 81 has a coiled part of a wire retained by a holder 82 provided to the opening/closure base 66, while having one of both ends of the coiled part of the wire retained by the opening/closure base 66 and having the other end engaged with a cut-out 79a of the second engagement member 79.

Thus, the second engagement member 79 is mounted to the opening/closure base 66, in such a state that, as a distal end 79c thereof is protruded from the holding opening 80, the paired engagement lugs 79b are engaged in the holding opening 80, and the proximal end thereof is carried in a biased state by the other end of the second torsion coil spring 81, so that the distal end 79c is movable in a direction at right angles to the direction along the lateral surface of a housing of the cartridge for BD 51, and also pivotally movable in the direction along the lateral surface of the housing, as later explained, as shown in FIG. 17. That is, this second engagement member 79 is biased by the second torsion coil spring 81 in a direction protruding from the holding opening. 80 and may be pushed into the inside of the holding opening 80 against this bias force. Moreover, the distal end 79c of the second engagement member 79 may be pivotally moved along the longitudinal direction of the opening/closure base 66. The paired engagement lugs 79b are inclined in keeping with the inclination of the distal end 79c of the second engagement member 79 in order to gain the stroke in the holding opening 80 when the distal end 79c of the second engagement member 79 has performed a fore-and-aft movement. The distal end 79c of the second engagement member 79 is inclined to provide for facilitated disengagement of the inner rotor 10 from a second mating engagement section 108. Moreover, the distal end 79c of the second engagement member 79 is chamfered to prevent the distal end from being irretrievably caught by the peripheral wall of the holding opening 80 when the distal end 79c is pushed into the holding opening 80 of the opening/closure base 66.

The opening/closure base 66 of the shutter opening/closing mechanism 65 is mounted to the upper end of one of the paired chuck sliders 56, as shown in FIG. 7.

Figure 18:
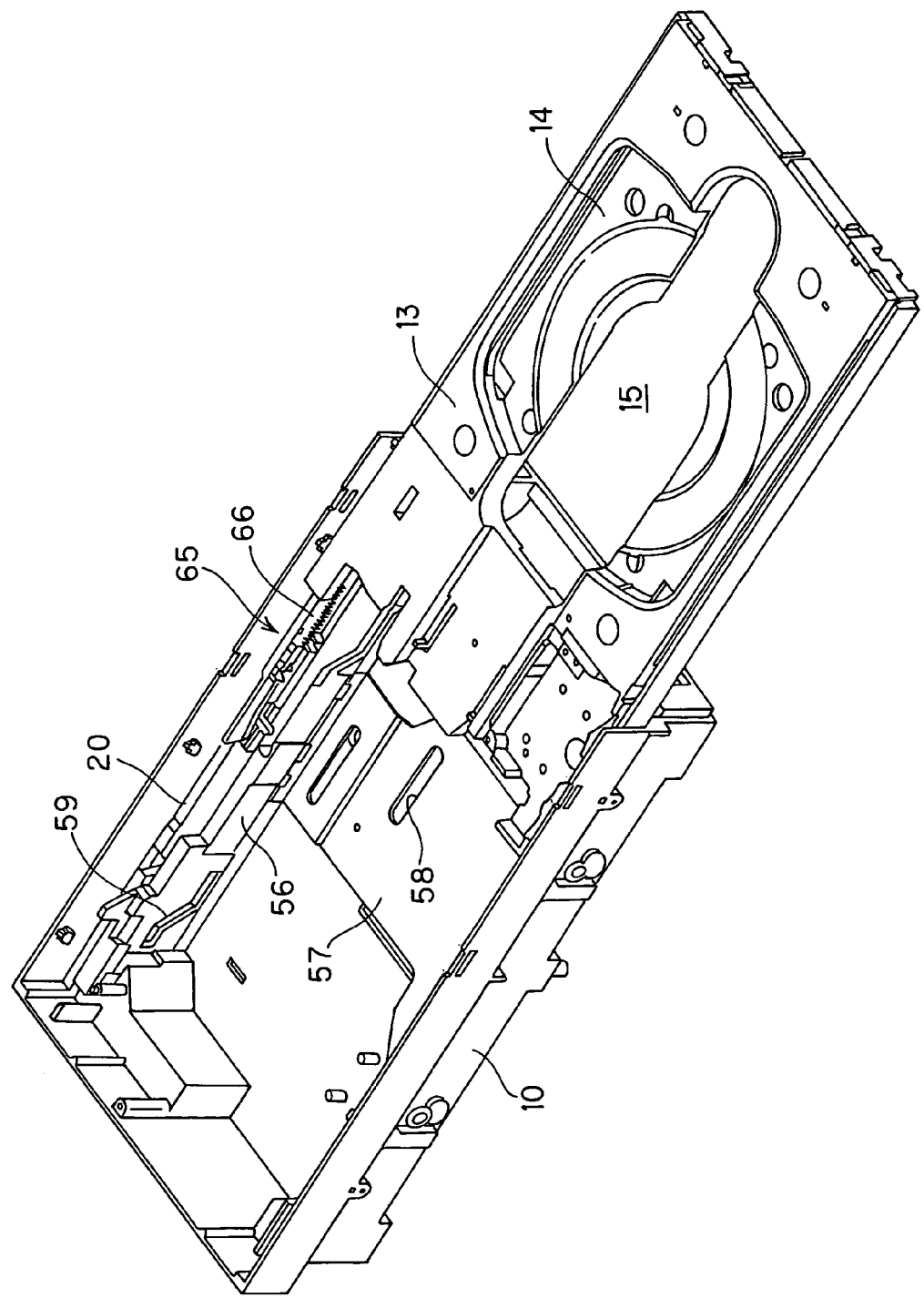
FIG. 18 is a perspective view showing the state in which the tray has been pulled outwards.
Figure 19:
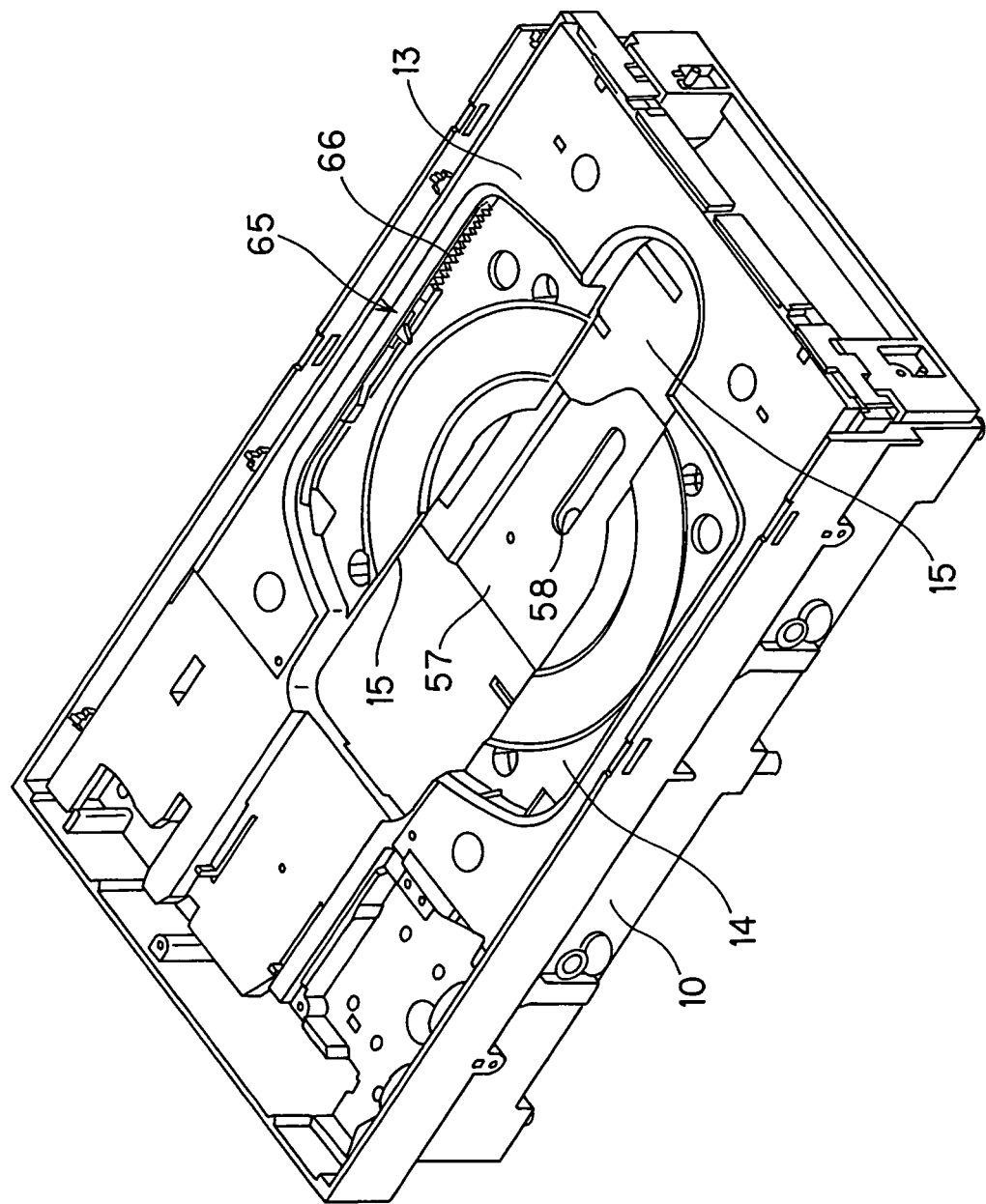
FIG. 19 is a perspective view showing the state in which the tray has been pulled inwards
Figure 20:
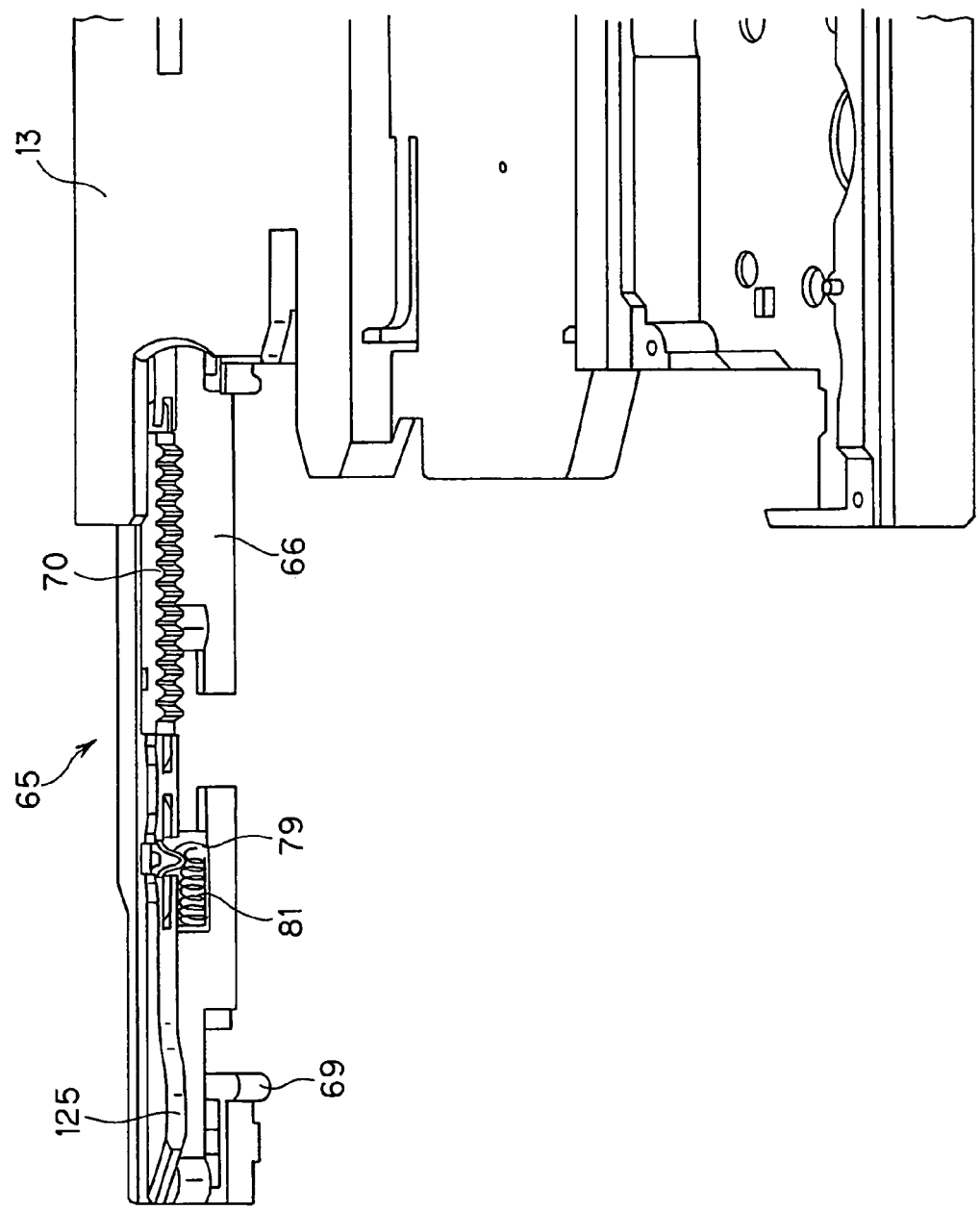
FIG. 20 is a schematic perspective view showing the position of the shutter opening/closing mechanism when the tray has been pulled outwards.
Figure 21:
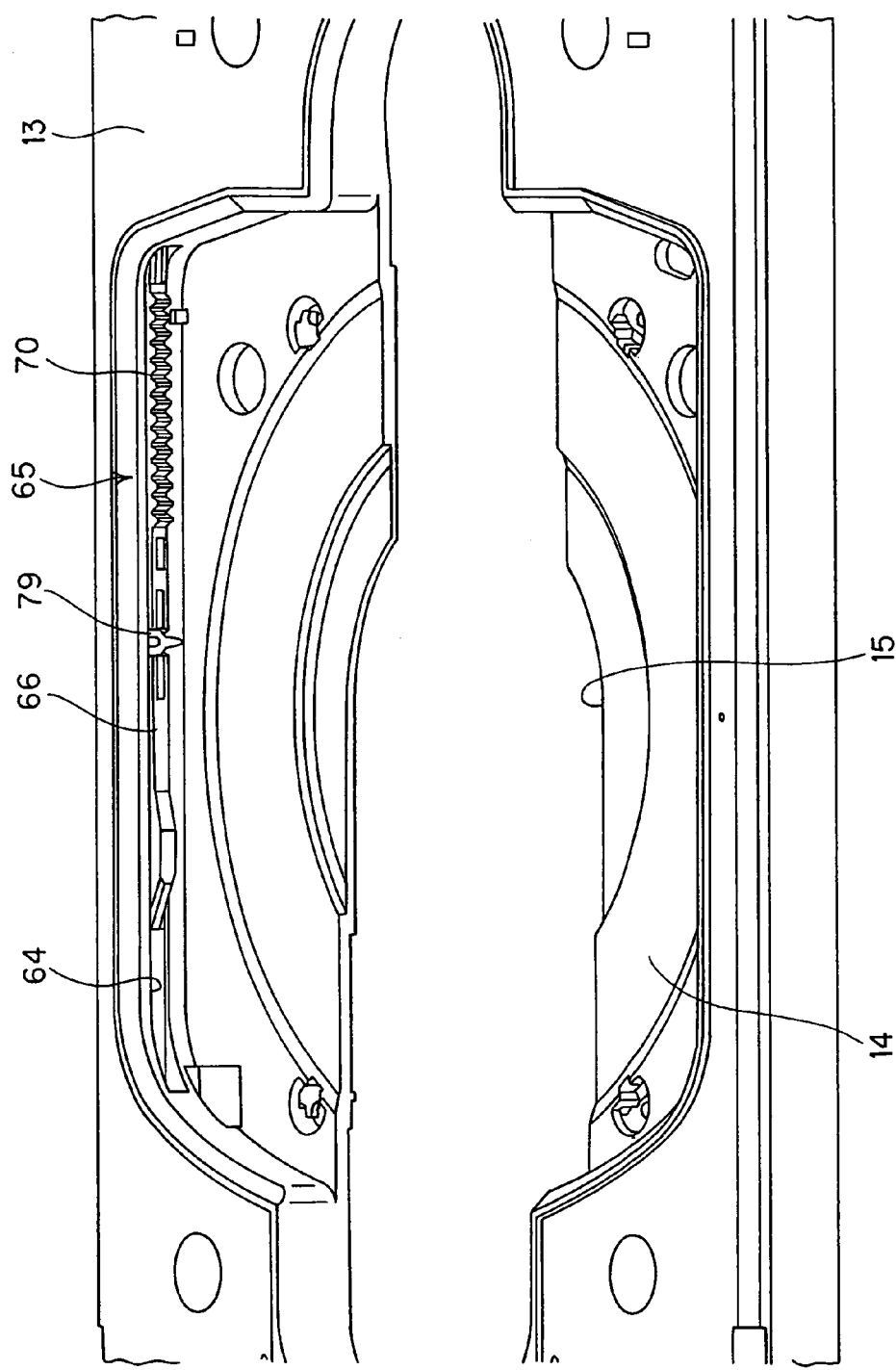
FIG. 21 is a schematic perspective view showing the state in which the shutter opening/closing mechanism has intruded downwards.
Figure 22:
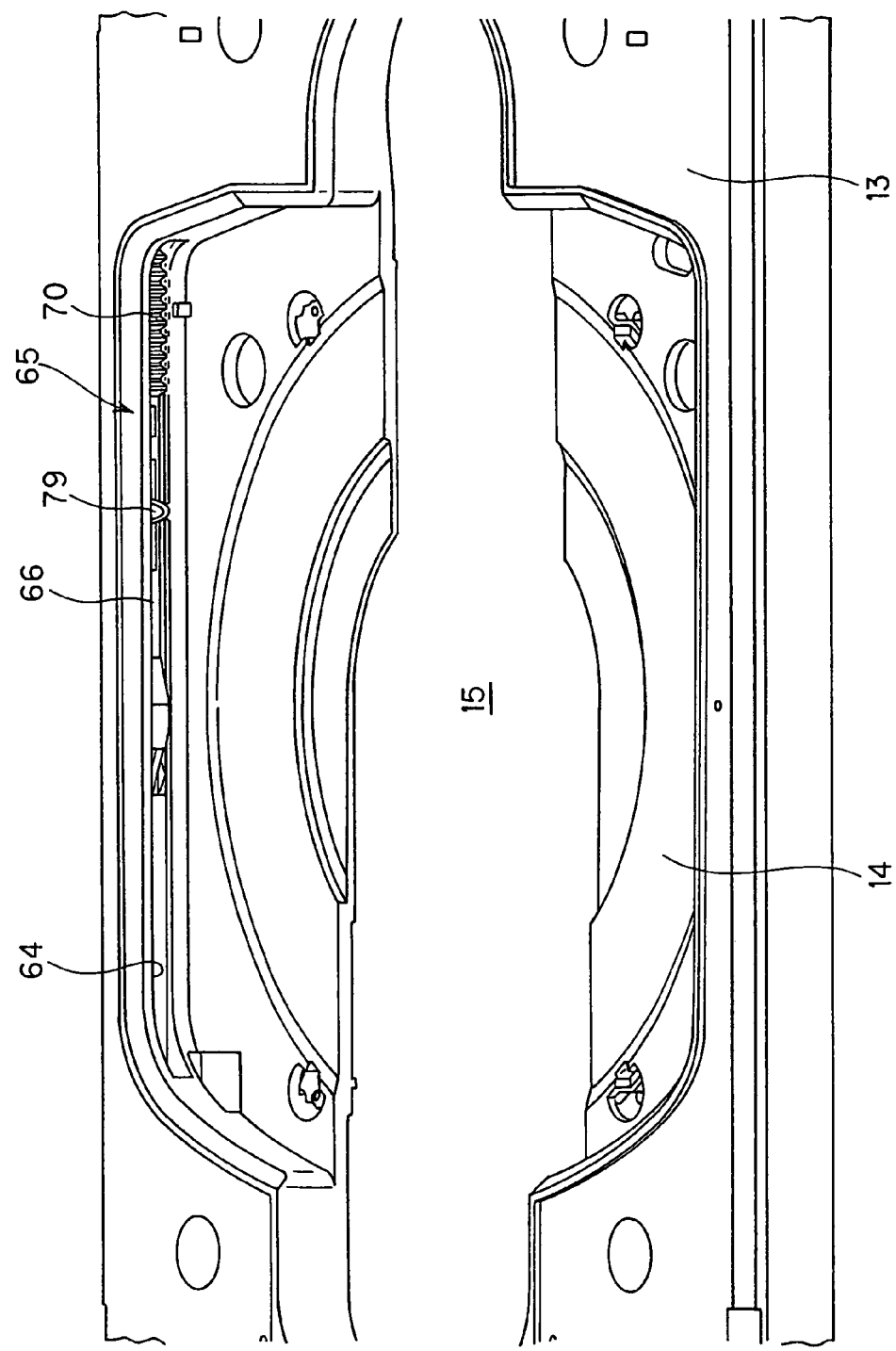
FIG. 22 is a schematic perspective view showing the position of the shutter opening/closing mechanism when the tray has been pulled inwards.

When the tray 13 is moved from the pull-out position, shown in FIG. 18, to the housed position, shown in FIG. 19, where the tray 13 is pulled into the inside of the outer casing 10, the shutter opening/closing mechanism is intruded from the rearward side to the underside of the tray 13, in conjunction with the loading of the tray 13, as shown in FIGS. 20 to 22, so that the rack member 70, first engagement member 75 and the second engagement member 79, mounted to the opening/closure base 66, face the inside of the holder 14 via a slit 64 formed in the tray 13.

At this time, the opening/closure base 66 performs relative movement along the one lateral surface of the housing of the cartridge for BD 51, retained by the holder 14 of the tray 13. Thus, the rack member 70, first engagement member 75 and the second engagement member 79, mounted to the opening/closure base 66, may be in sliding contact with the outer rim of the inner rotor 101 facing outwards via one lateral surface of the housing of the cartridge for BD 51, which will be explained subsequently.

The lower side of the tray 13 includes a cam 85 and a lug 86 for facing the shutter opening/closing mechanism 65, performing a sliding movement, as shown in FIGS. 23 to 26. The cam 85 operates for causing movement of the shutter opening/closing mechanism 65 in a direction away from the cartridge 51, while the lug 86 operates for thrusting the shutter opening/closing mechanism 65 in a direction approaching to the cartridge 51.

Figure 23:
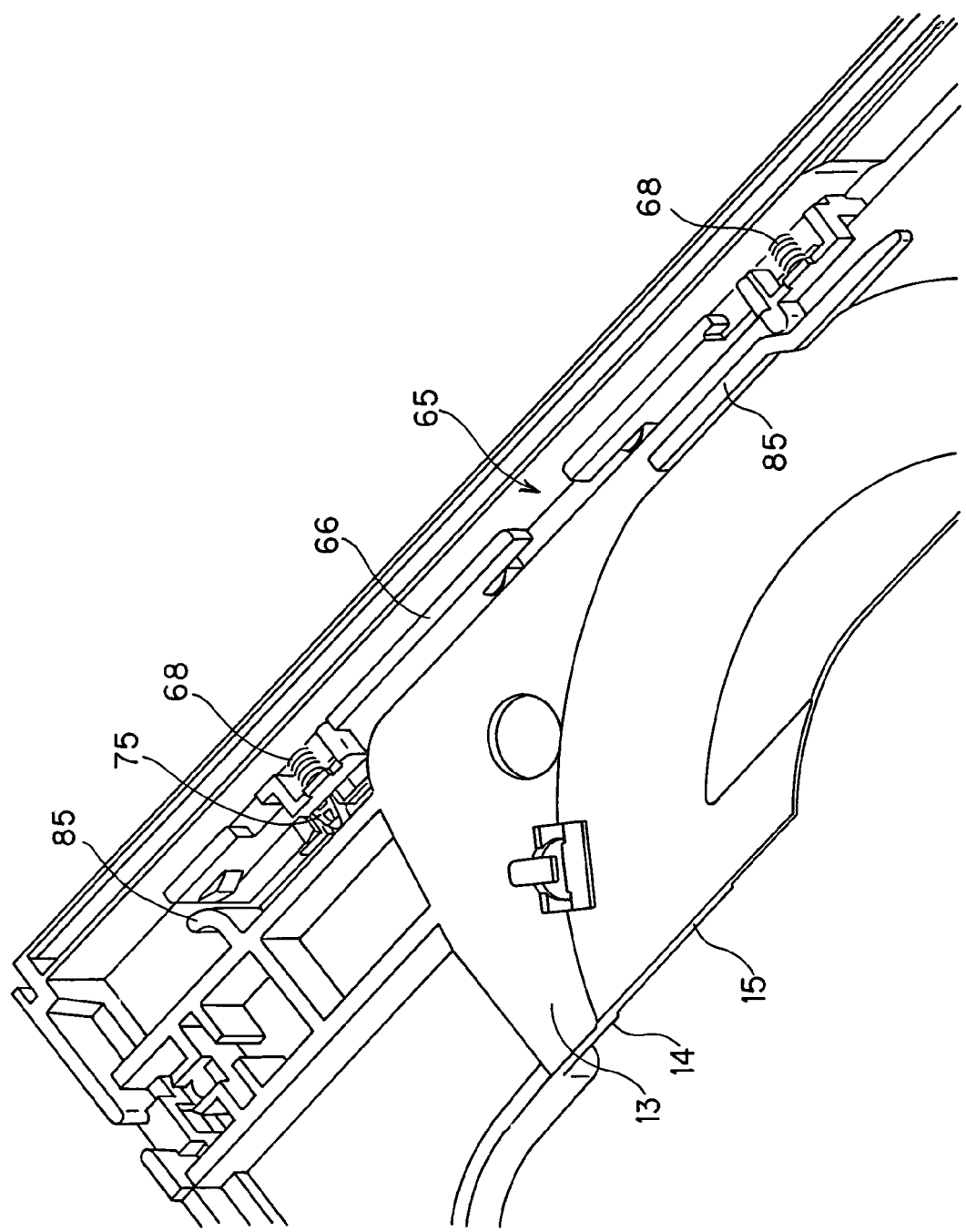
FIG. 23 is a schematic perspective view showing the back side of the tray when the shutter opening/closing mechanism has been moved forwards.
Figure 24:
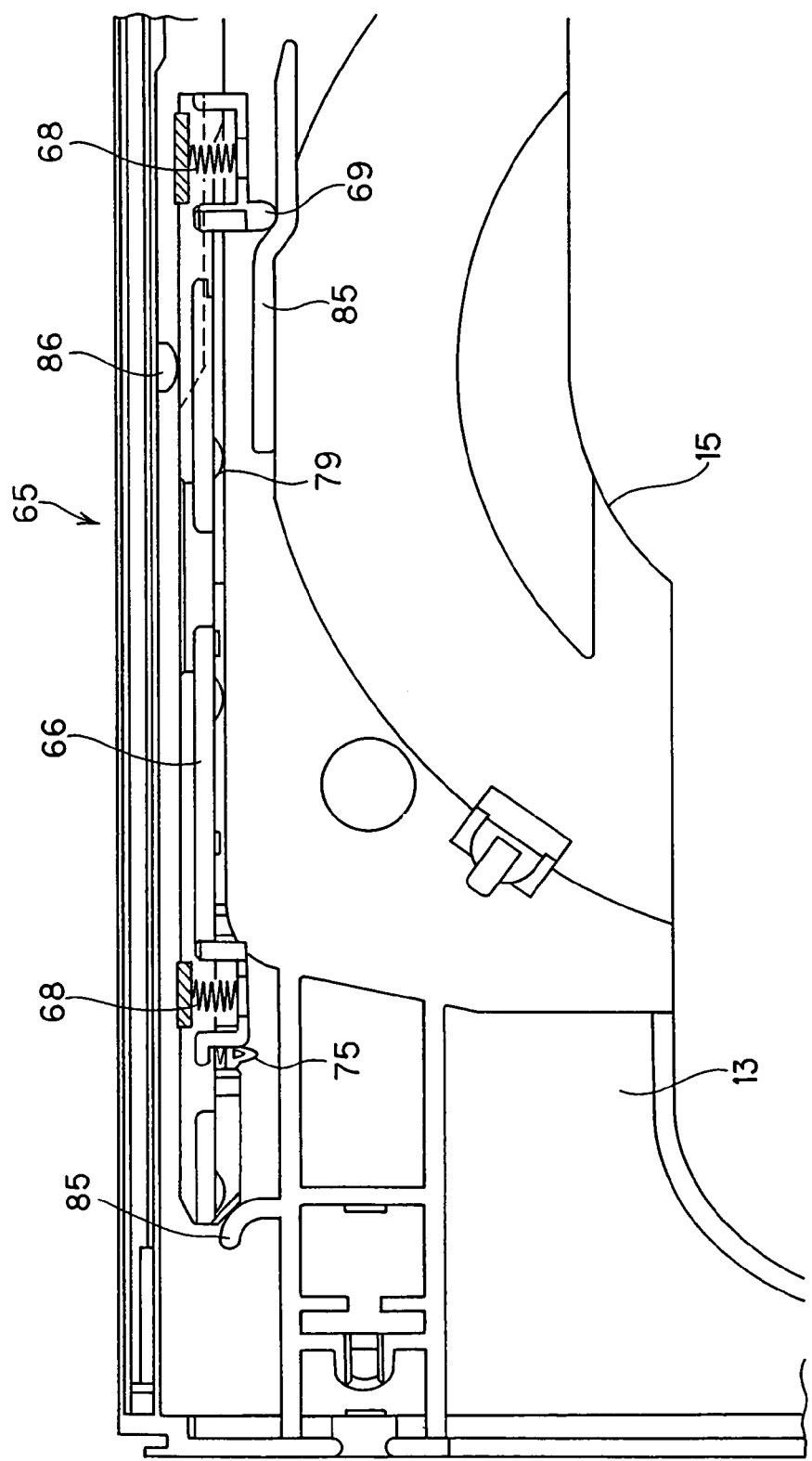
FIG. 24 is a schematic plan view showing the forward movement of the shutter opening/closing mechanism by a lug, looking from the reverse side of the tray.
Figure 25:
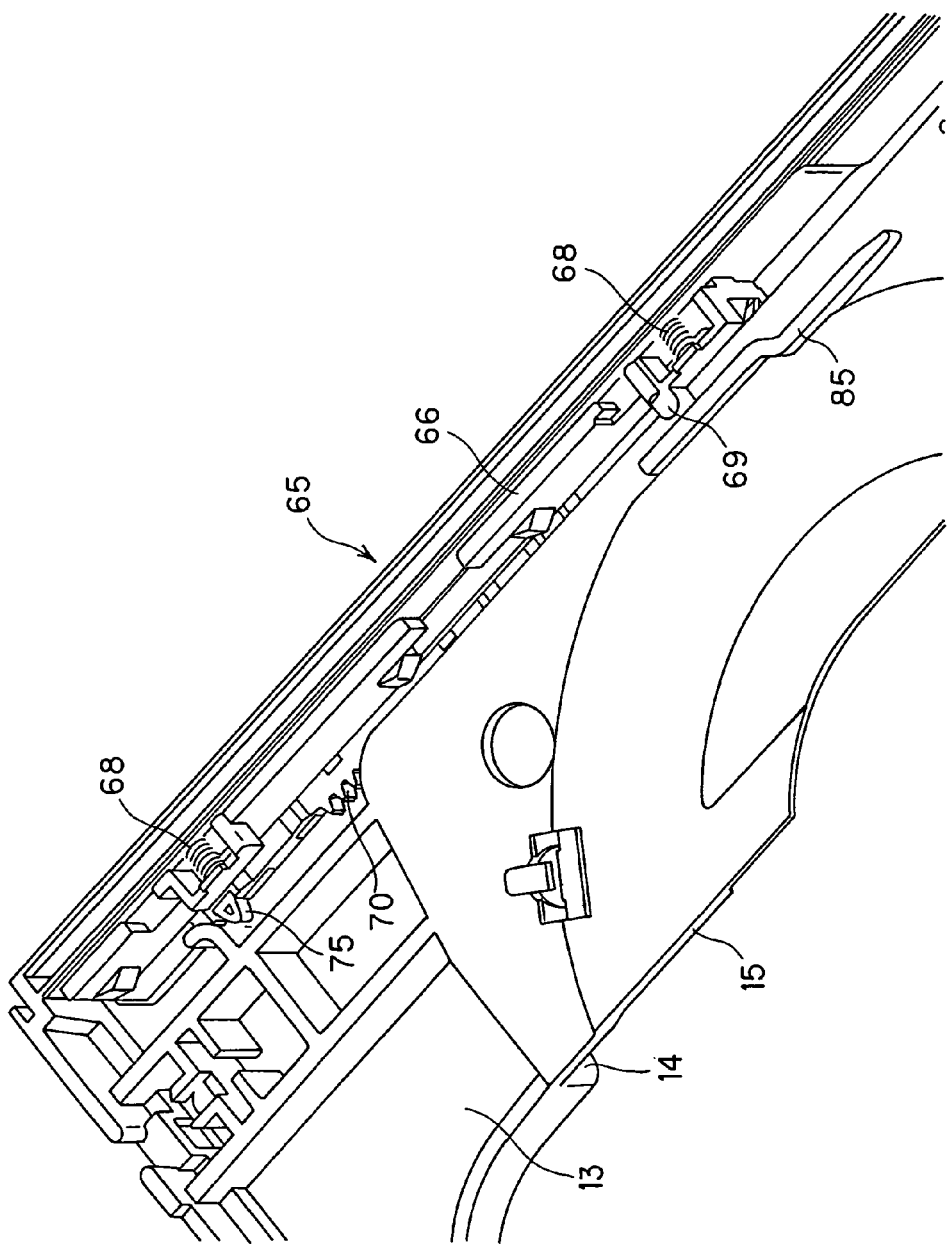
FIG. 25 is a schematic perspective view showing the back side of the tray when the shutter opening/closing mechanism has been moved backwards.
Figure 26:
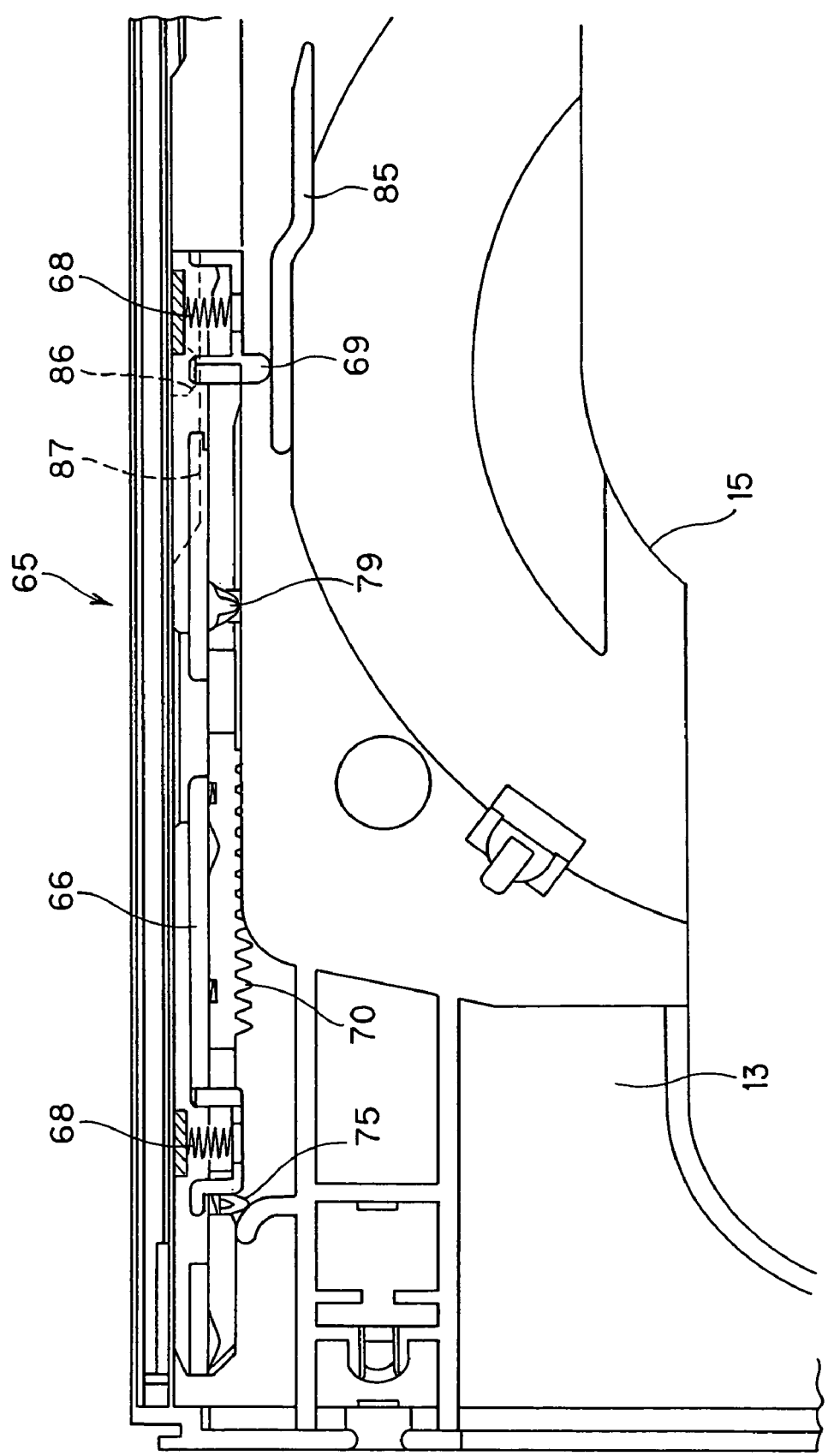
FIG. 26 is a schematic plan view showing the backward movement of the shutter opening/closing mechanism by a cam, looking from the back side of the tray.

Thus, when the shutter of the cartridge for BD 51 is to be opened by the shutter opening/closing mechanism 65, the lug 86 thrusts the opening/closure base 66 of the shutter opening/closing mechanism 65 for protruding into the inside of the holder 14 of the tray 13 from the back side via slit 64, as shown in FIGS. 23 and 24. When the operation of opening the shutter of the cartridge for BD 51 by the shutter opening/closing mechanism 65 has come to a close, the cam 65 causes the shutter opening/closing mechanism 65 to be retreated to clear the holder 14 of the tray 13 via slit 64, as shown in FIGS. 25 and 26. The lug 86 is received at this time in a recess 87 formed in the opening/closure base 66.

The shutter structure of the cartridge for BD 51, opened and closed by the above-described shutter opening/closing mechanism 65, is hereinafter explained.

Figure 27:
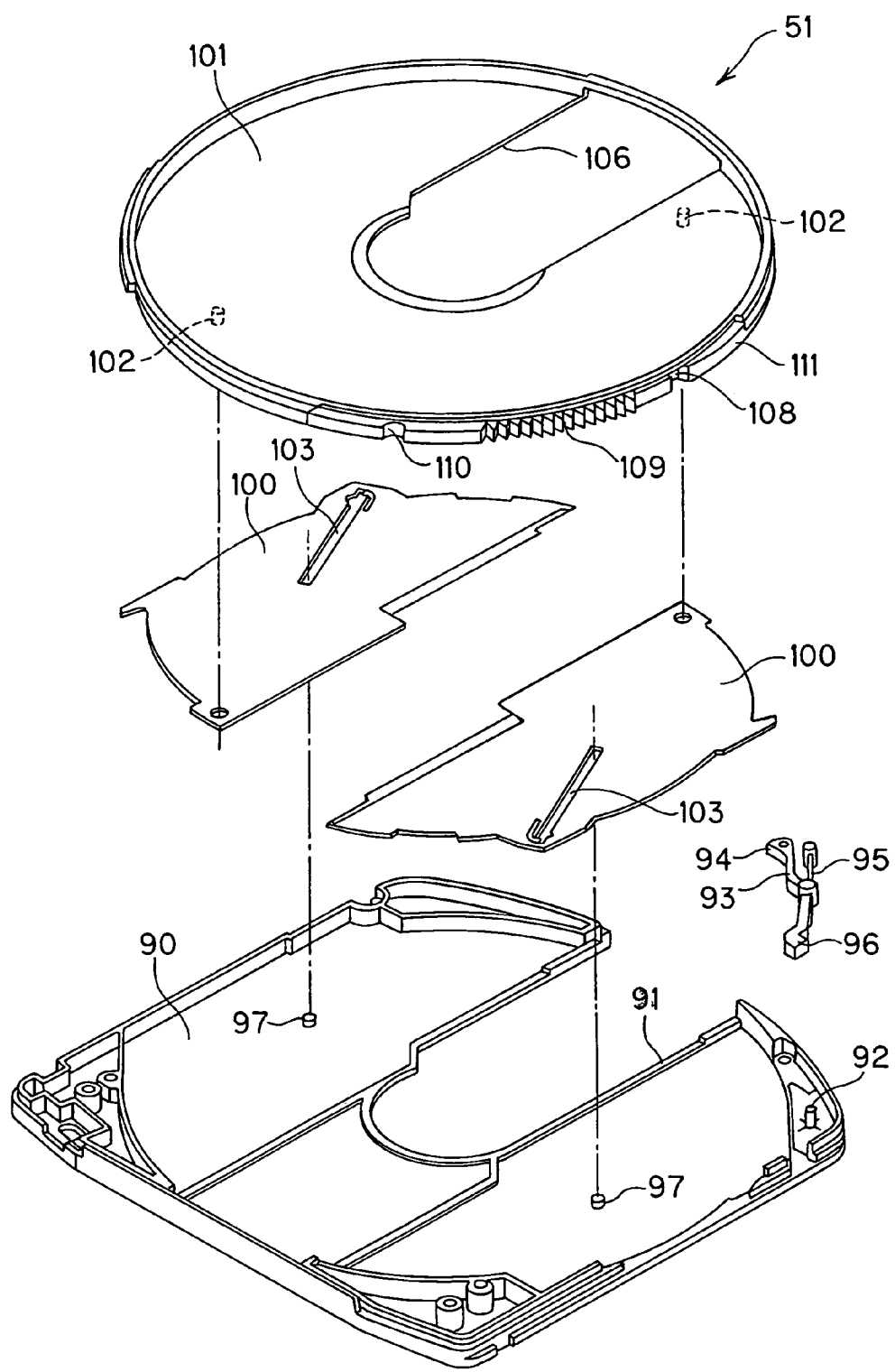
FIG. 27 is an exploded perspective view showing the shutter structure of the cartridge for a BD.

Referring to FIG. 27, the cartridge for BD 51 comprises a housing, made up by an upper shell and a lower shell, combined together. Within the housing are housed an optical disc, as a disc-shaped recording medium, the inner rotor, as an intermediate shell, and a pair of shutter members 100.

Meanwhile, FIG. 27 shows the structure of a portion of the cartridge 51 lower than the housing section for the disc-shaped recording medium. A lower shell 90, forming the lower surface of the housing, is formed with an aperture 91 which allows for accessing to the turntable 27 and the optical pickup for BD 32.

A pin 92 is set upright at one corner towards the aperture 91 of the lower shell 90. This pin 92 rotationally supports a lock lever 93. The lock lever 93, used for locking the inner rotor 101, has a lock part 94 and an elastic piece 95 at one end, while having a thrust portion 96 at its opposite end. A pair of opening/closure pins 97 are formed upright on the inner surface of the lower shell 90.

A pair of shutter members 100 are arranged on the lower shell 90. These shutter members 100 are rotatably mounted via pivot pins 102 on the lower surface of the inner rotor 101. A slit 103 is formed in each of the paired shutter members 100. These slits 103 are engaged by the opening/closure pins 97 of the lower shell 97 to effect the opening/closure movement interlocked with the rotation of the inner rotor 101.

The inner rotor 101 is formed with an aperture 106 approximately in register with the aperture 91 of the lower shell 90. On the outer rim of the inner rotor 101, there are formed a second mating engagement section 108, a segment gear 109, circumferentially slightly offset from the second mating engagement section 108, and a first mating engagement section 110, offset a preset angle with respect to the segment gear 109. The first mating engagement section 110, segment gear 109 and the second mating engagement section 108 are engaged by the first engagement member 75, rack member 70 and by the second engagement member 79.

The shutter opening operation of the cartridge for BD 51 by the shutter opening/closing mechanism 65 when the cartridge for BD 51 is loaded and moved to the recording and/or reproducing position is hereinafter explained.

Figure 28:
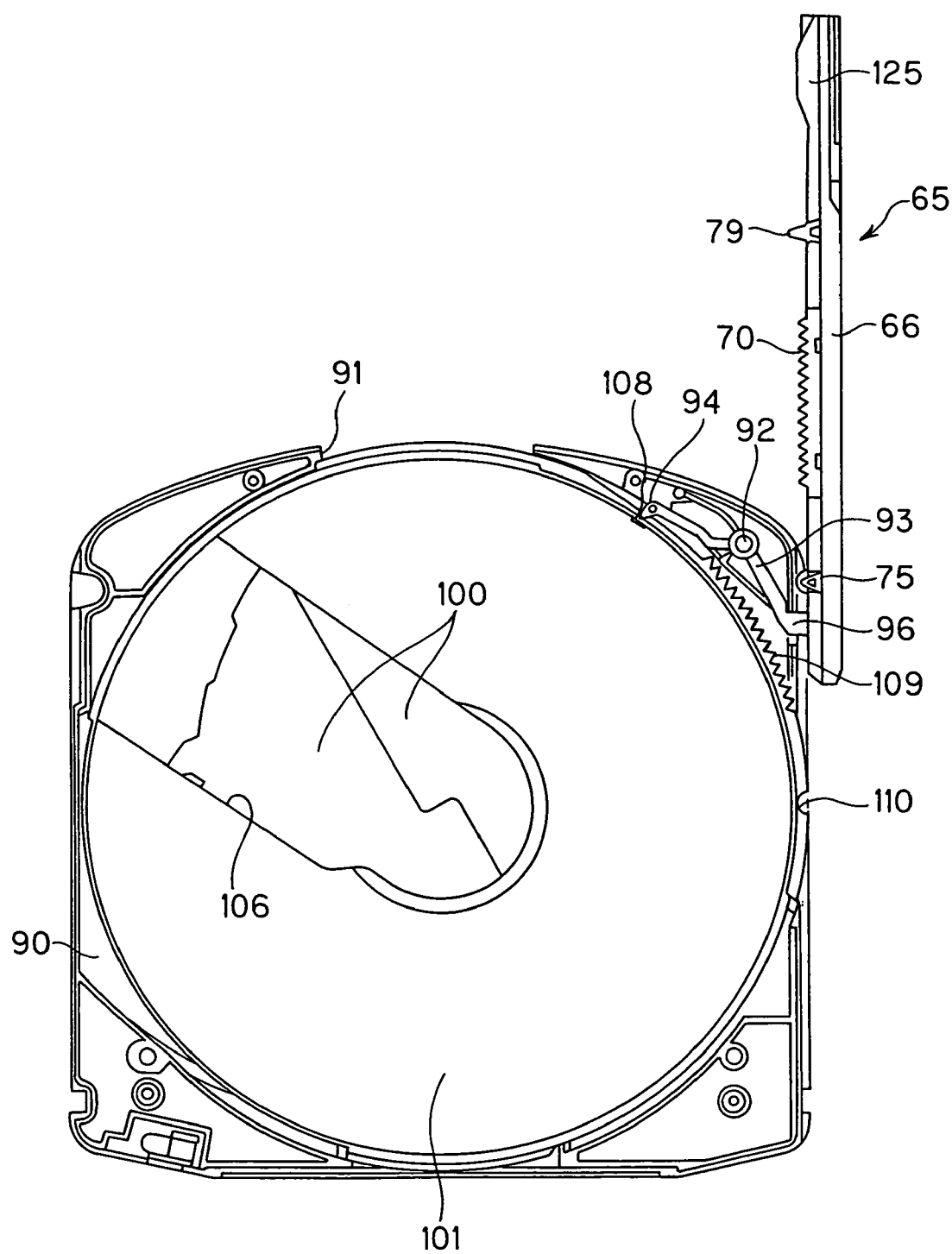
FIG. 28, illustrating the shutter opening/closing operation by the shutter opening/closing mechanism, is a plan view showing the state in which an inner rotor has been unlocked.

In this disc driving apparatus 1, when the tray 13, carrying the cartridge 51 thereon, is pulled into the outer casing 10, the distal end of the opening/closure base 66 thrusts the thrust part 96 of the lock lever 93, this lock lever being then rotated clockwise in the drawing, about the pin 92 as the center of rotation, for disengaging the lock part 94 from the second mating engagement section 108 of the inner rotor 101, as shown in FIG. 28. This releases the locked state by the lock lever 93 of the inner rotor 101. On the other hand, the lug 86 thrusts the opening/closure base 66 of the shutter opening/closing mechanism 65 from the back side via slit 64 for protruding into the inside of the holder 14, as shown in FIGS. 23 and 24.

Figure 29:
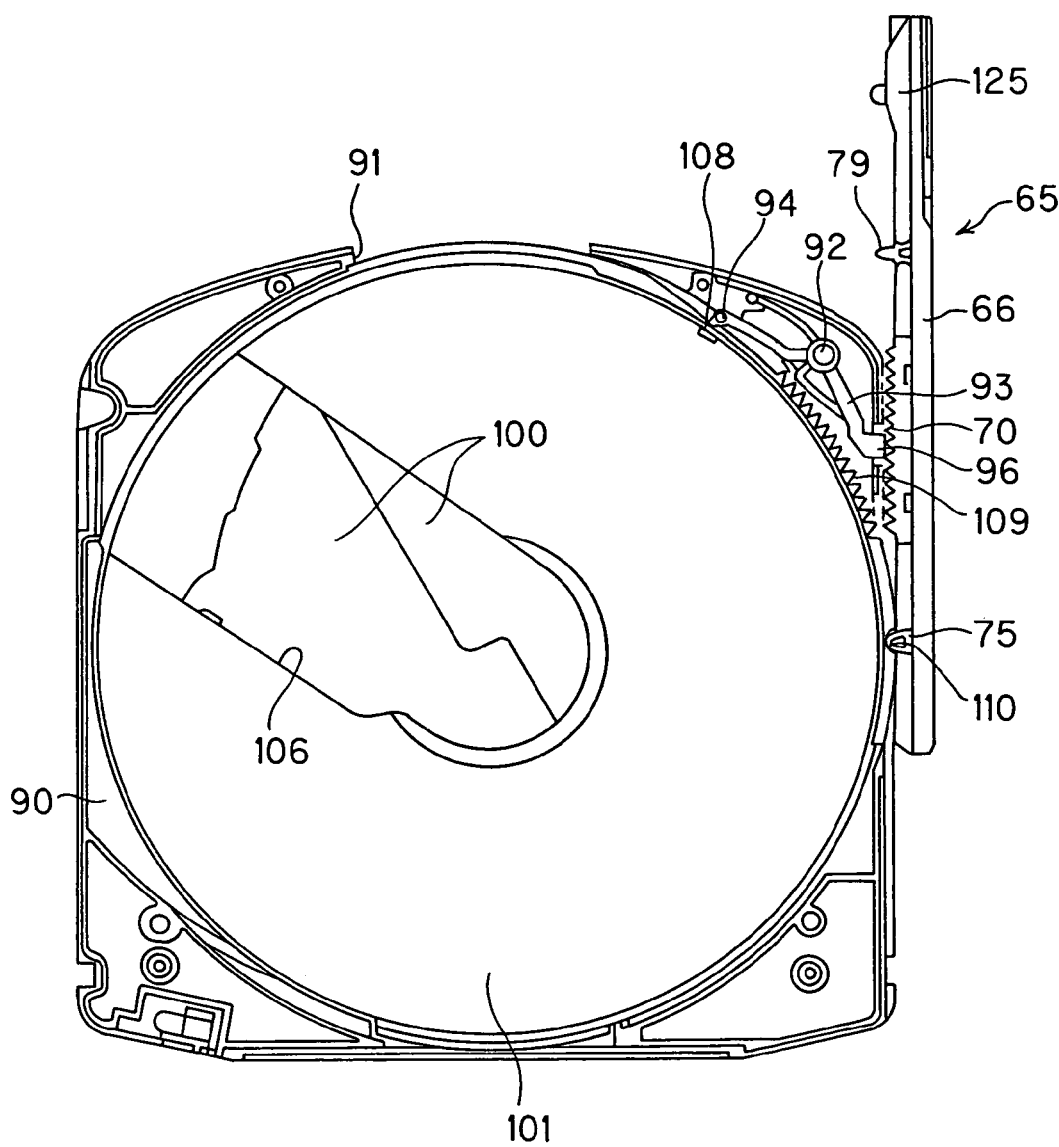
FIG. 29, illustrating the shutter opening/closing operation by the shutter opening/closing mechanism, is a plan view showing the state in which a first engagement member has become engaged with a first mating engagement section of the inner rotor.

If, in this state, the tray 13 is intruded further, the first engagement member 75 is intruded into a groove formed in one lateral side of the cartridge 51, in conjunction with the relative movement of the opening/closure base 66, into engagement with the first mating engagement section 110 of the inner rotor 101, facing outwards via one lateral side of the cartridge 51, as shown in FIG. 29.

Figure 30:
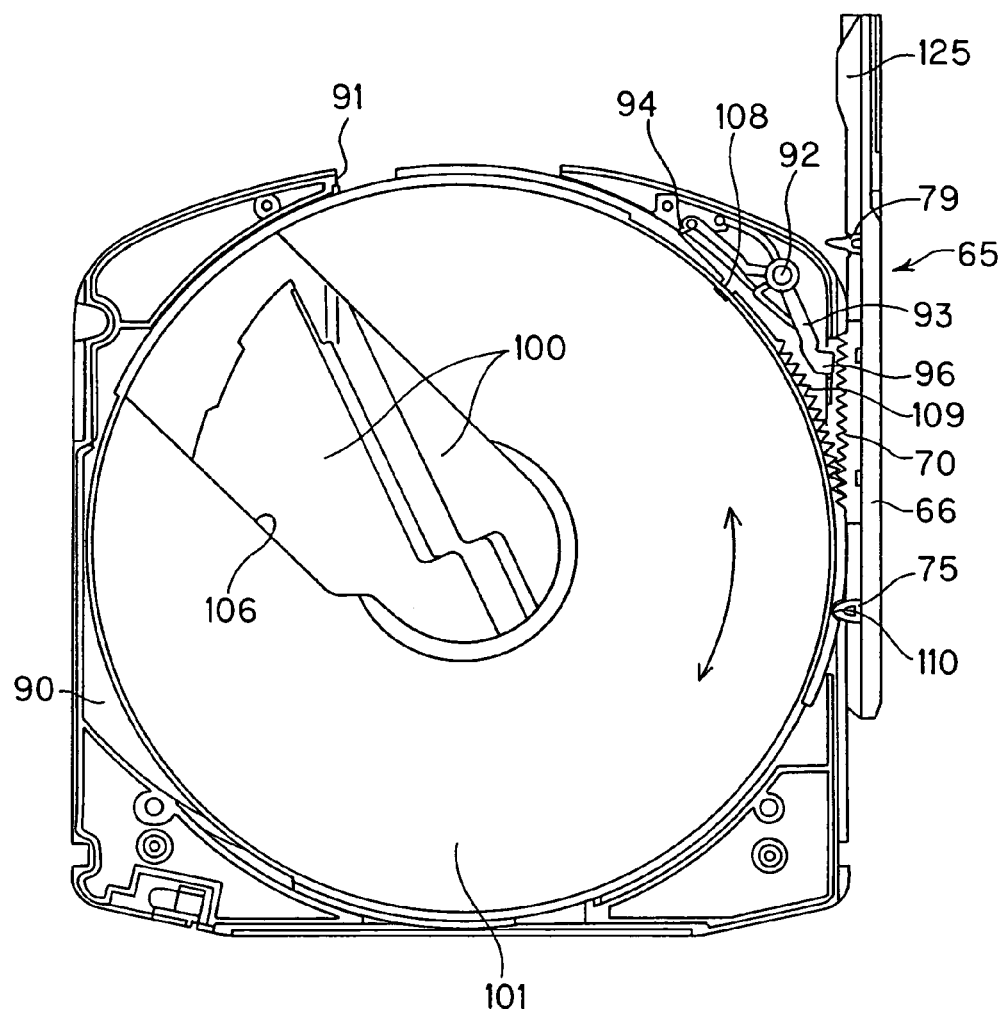
FIG. 30, illustrating the shutter opening/closing operation by the shutter opening/closing mechanism, is a plan view showing the state in which the inner rotor is rotated by the engagement of the first mating engagement section with the first engagement member.

If the inner rotor 101 is rotated further clockwise from this state in the drawing, by engagement between the first mating engagement section 110 and the first engagement member 75, the rack member 70 meshes with the segment gear 109 of the inner rotor 101, as shown in FIG. 30. The shutter members 100 commence to open the aperture 106 of the inner rotor 101, as the shutter members are rotated about the pivot pins 102 as the center of rotation.

Figure 31:
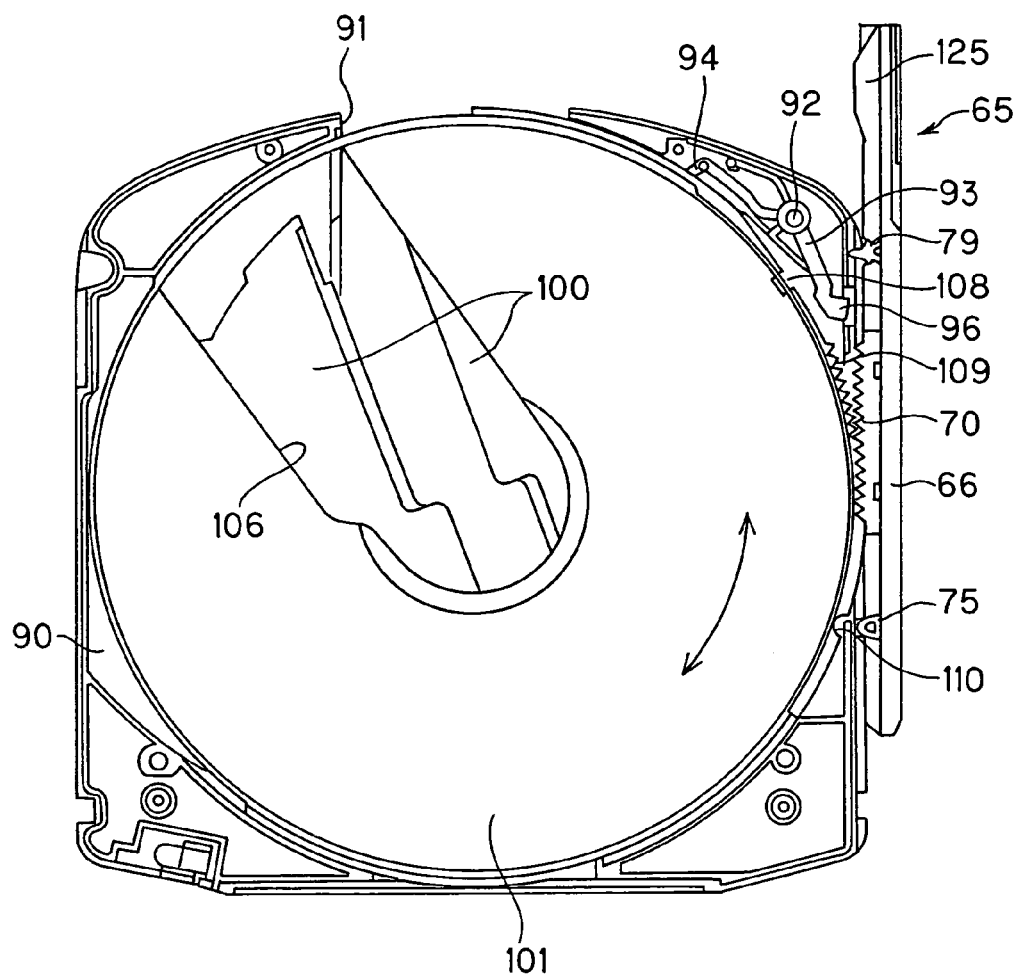
FIG. 31, illustrating the shutter opening/closing operation by the shutter opening/closing mechanism, is a plan view showing the state in which the first engagement member has been detached from the first mating engagement section of the inner rotor.

When the inner rotor 101 is rotated clockwise in the drawing from this state relative to the lower shell 90, by the meshing of the segment gear 109 with the rack member 70, the first engagement member 75 is disengaged from the first mating engagement section 110 of the inner rotor 101, as shown in FIG. 31.

Figure 32:
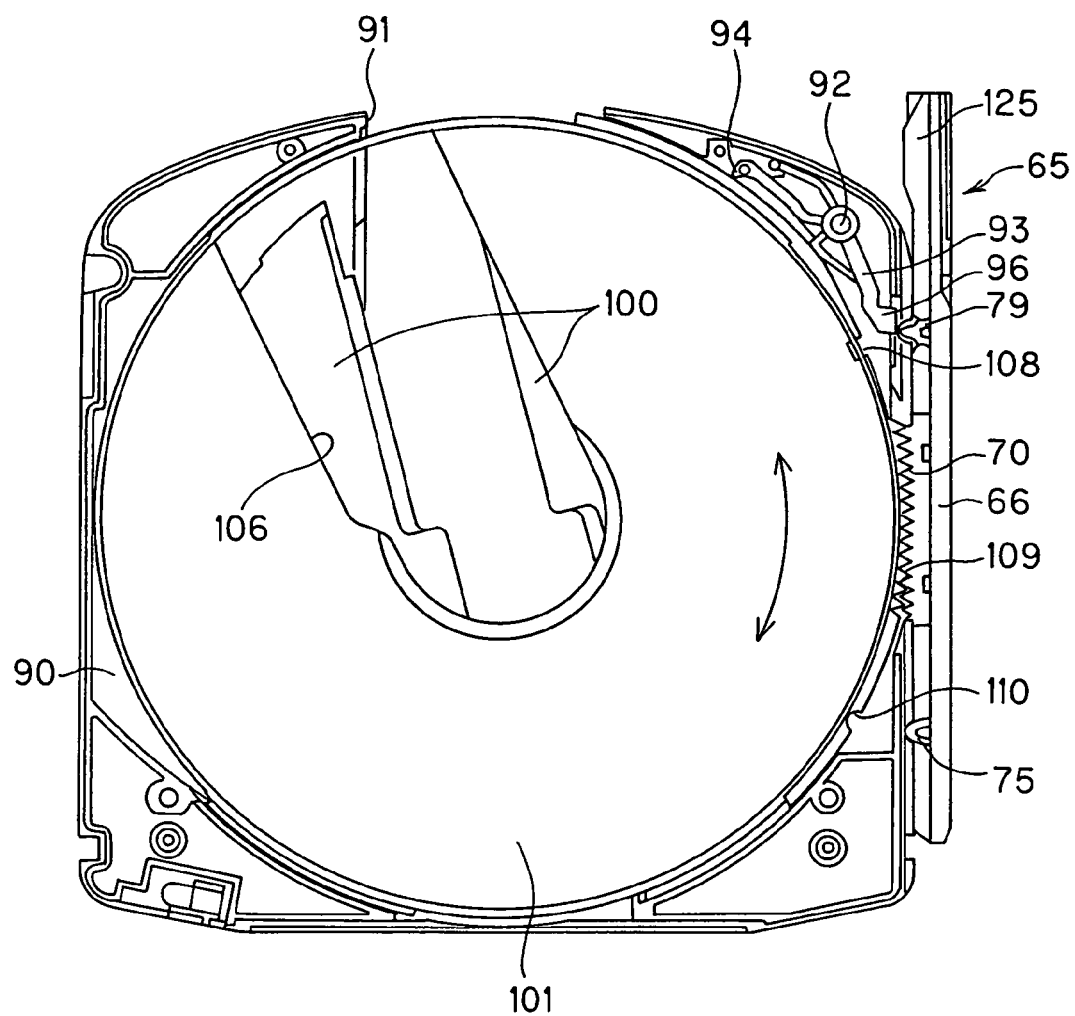
FIG. 32, illustrating the shutter opening/closing operation by the shutter opening/closing mechanism, is a plan view showing the state in which the inner rotor is rotated by the meshing of a segment gear with a rack member.

When the inner rotor 101 is rotated further clockwise in the drawing, by the meshing of the segment gear 109 with the rack member 70, the shutter member 100 opens the aperture 106 of the inner rotor 101 to a marked extent, as the shutter member 100 is rotated elative to the inner rotor 101 about the pivot pin 102 as the center of rotation, as shown in FIG. 32.

Figure 33:
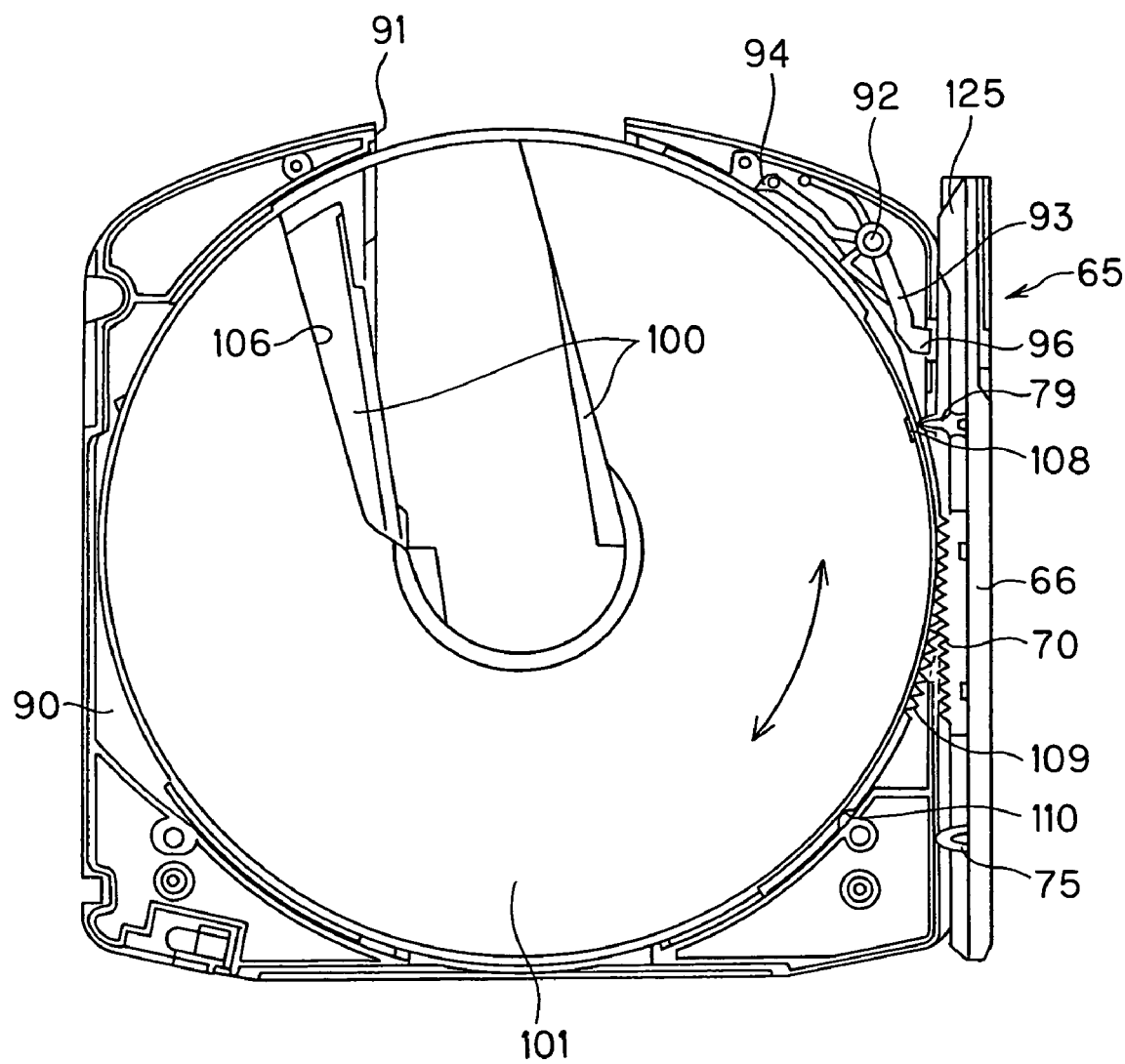
FIG. 33, illustrating the shutter opening/closing operation by the shutter opening/closing mechanism, is a plan view showing the state in which a second engagement member has become engaged with a second mating engagement section of the inner rotor.

When the inner rotor 101 is rotated approximately 40° clockwise from the closure position shown in FIG. 28, the second engagement member 79 is engaged with the second mating engagement section 108 of the inner rotor 101, as shown in FIG. 33.

Figure 34:
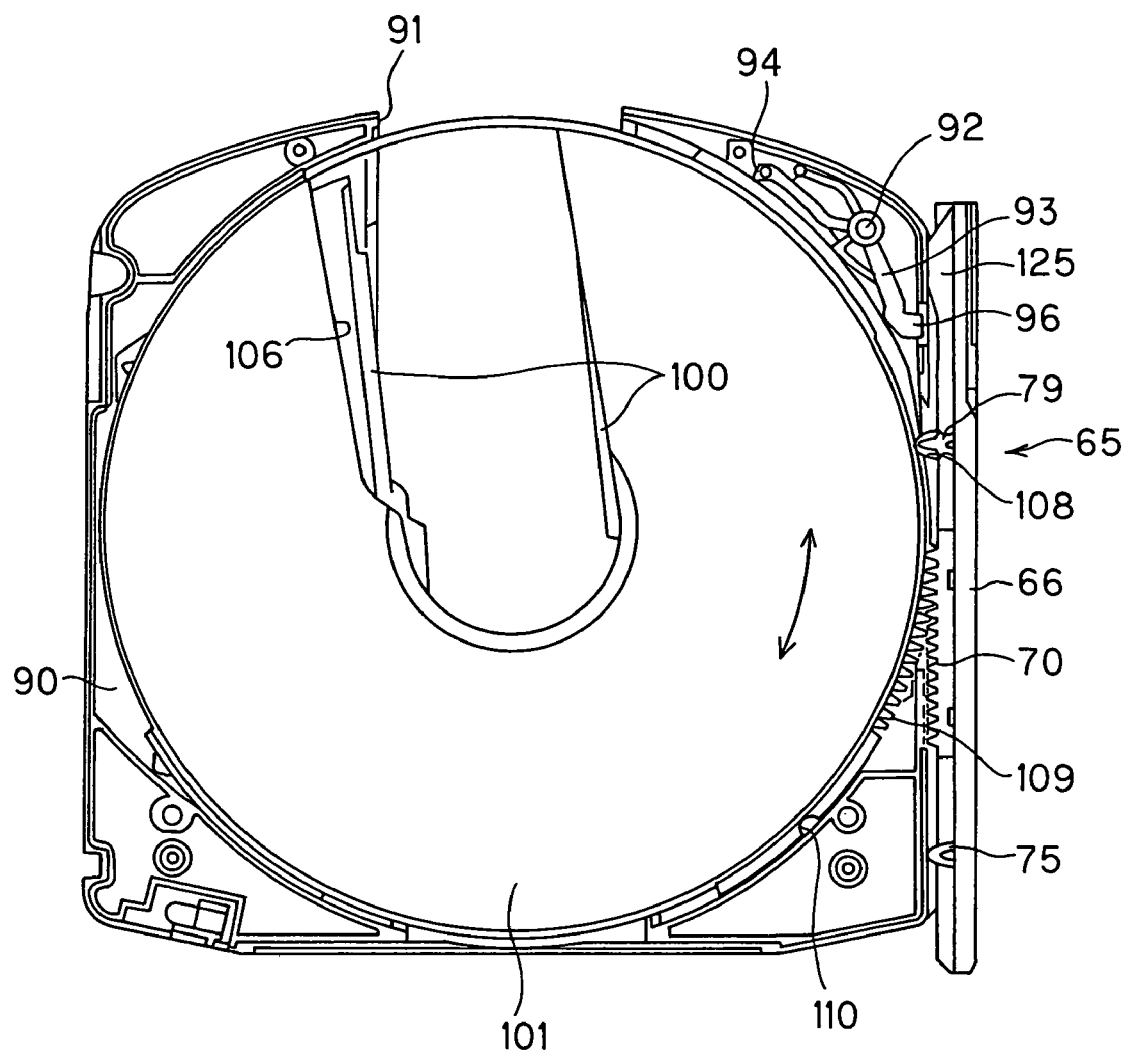
FIG. 34, illustrating the shutter opening/closing operation by the shutter opening/closing mechanism, is a plan view showing the state in which the inner rotor is rotated by the engagement of the second mating engagement section with the second engagement member.

If the inner rotor 101 is rotated further clockwise in the drawing, relative to the lower shell 90, by the meshing of the segment gear 109 with the rack member 70, the inner rotor 101 is rotated clockwise in the drawing, by the engagement of the second mating engagement section 108 with the second engagement member 79, as shown in FIG. 34.

Figure 35:
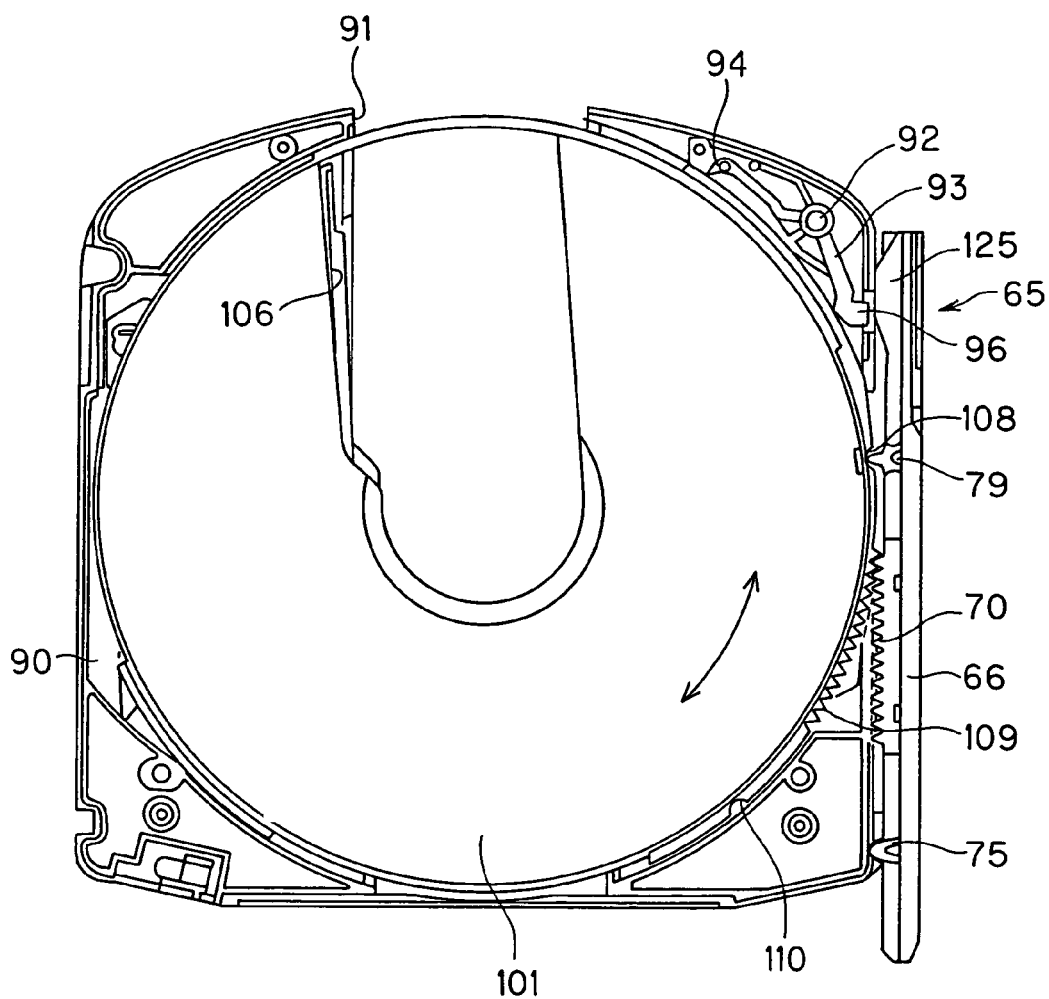
FIG. 35, illustrating the shutter opening/closing operation by the shutter opening/closing mechanism, is a plan view showing the state in which the shutter member has completely opened an aperture of the inner rotor.

If the inner rotor 101 is rotated clockwise approximately 50° in the drawing from the closure position shown in FIG. 28, the shutter members 100 completely opens the aperture 106 of the inner rotor 101, as shown in FIG. 35.

Figure 36:
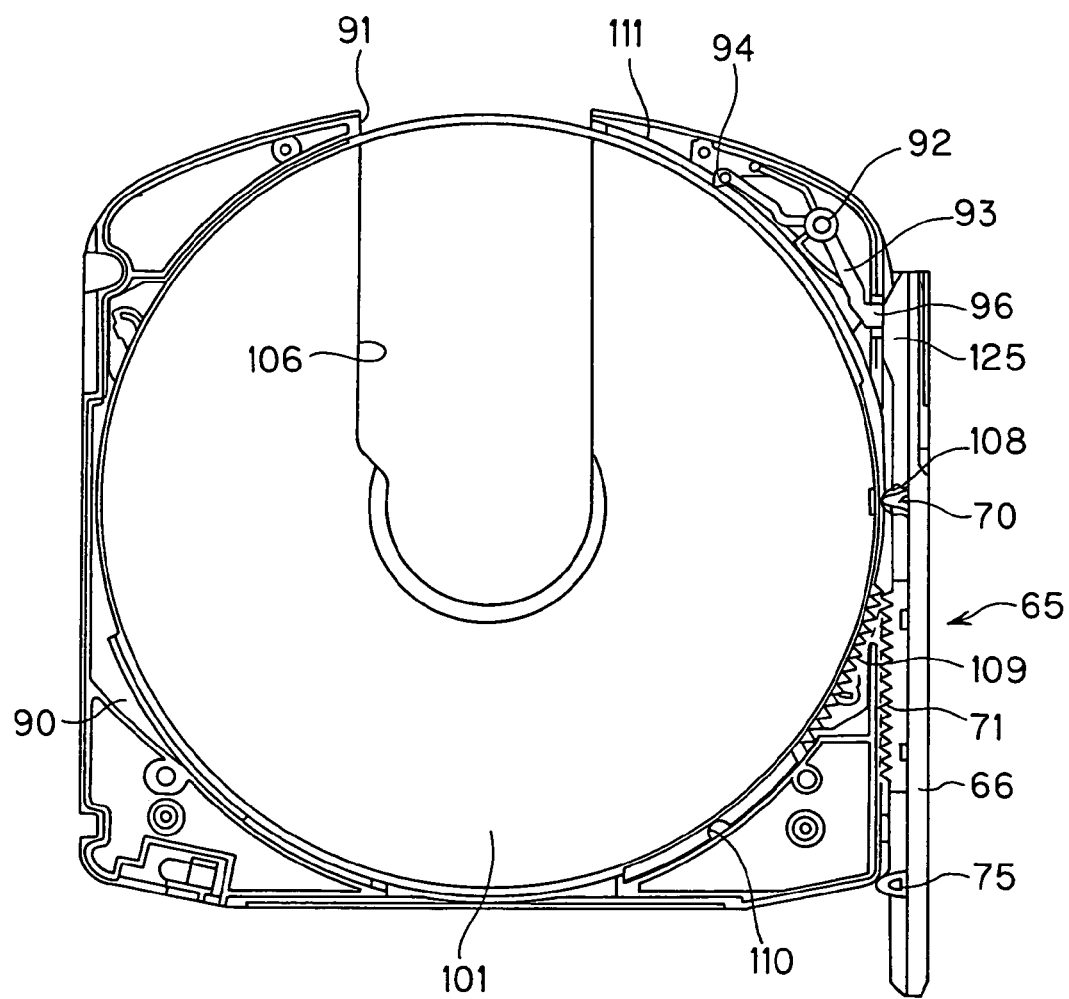
FIG. 36, illustrating the shutter opening/closing operation by the shutter opening/closing mechanism, is a plan view showing the state in which opened aperture of the inner rotor is in register with an aperture in a lower shell.

When the inner rotor 101 is rotated further clockwise in the drawing, relative to the lower shell 90, by the meshing of the second mating engagement section 108 with the second engagement member 79, the aperture 106 of the opened inner rotor 101 is substantially in register with the aperture 91 of the lower shell 90, as shown in FIG. 36. At this time, the inner rotor 101 is locked in the opened state, by the lock part 94 of the lock lever 93 engaging with the terminal end of a projection 111 of the inner rotor 101.

Figure 37:
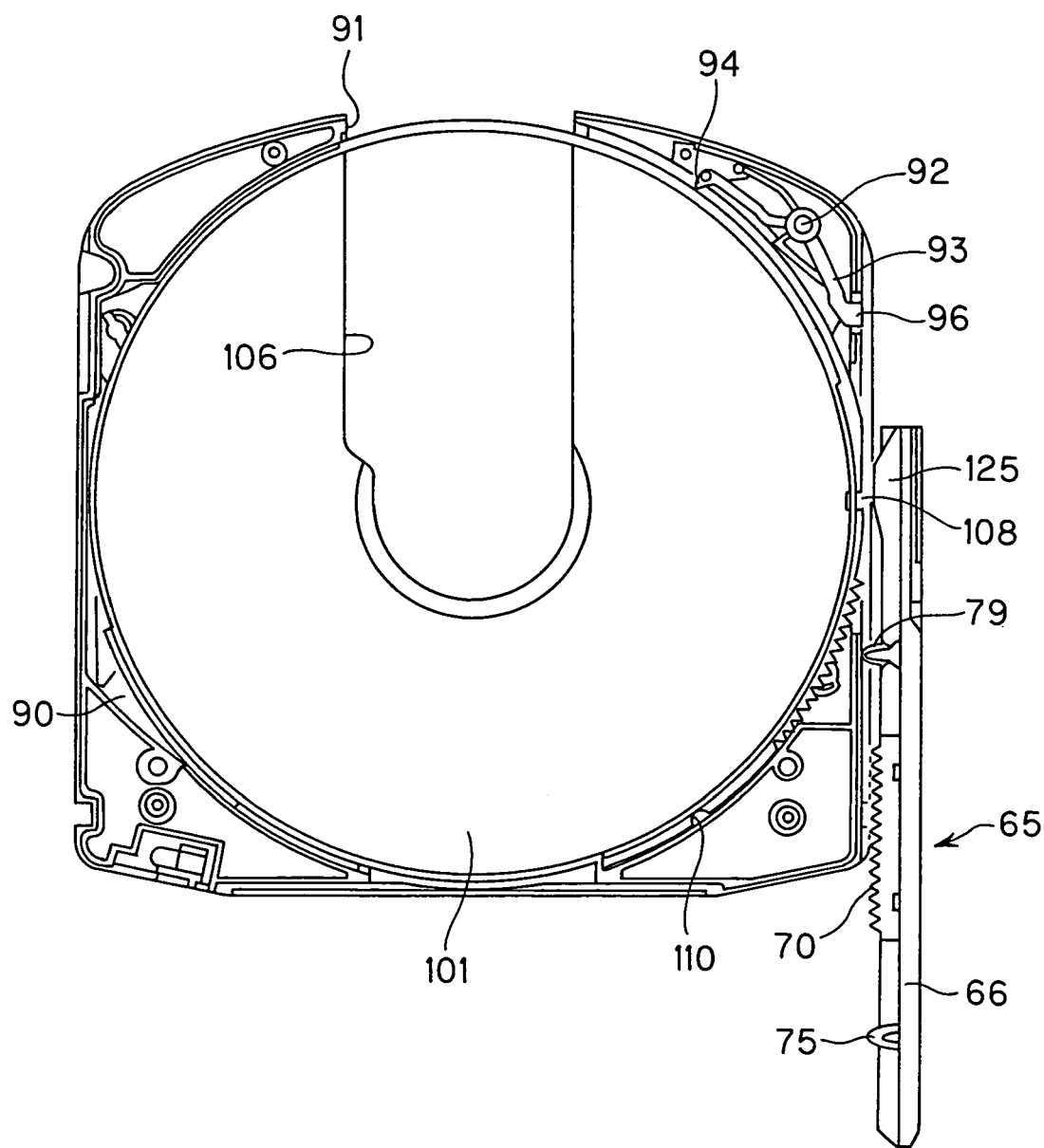
FIG. 37, illustrating the shutter opening/closing operation by the shutter opening/closing mechanism, is a plan view showing the state in which the second engagement member has been detached from the second mating engagement section of the inner rotor.

When the tray 13 is intruded further from this state, as shown in FIG. 37, the second engagement member 79 is disengaged from the second mating engagement section 108, in conjunction with relative movement of the opening/closure base 66, as shown in FIG. 37.

Figure 38:
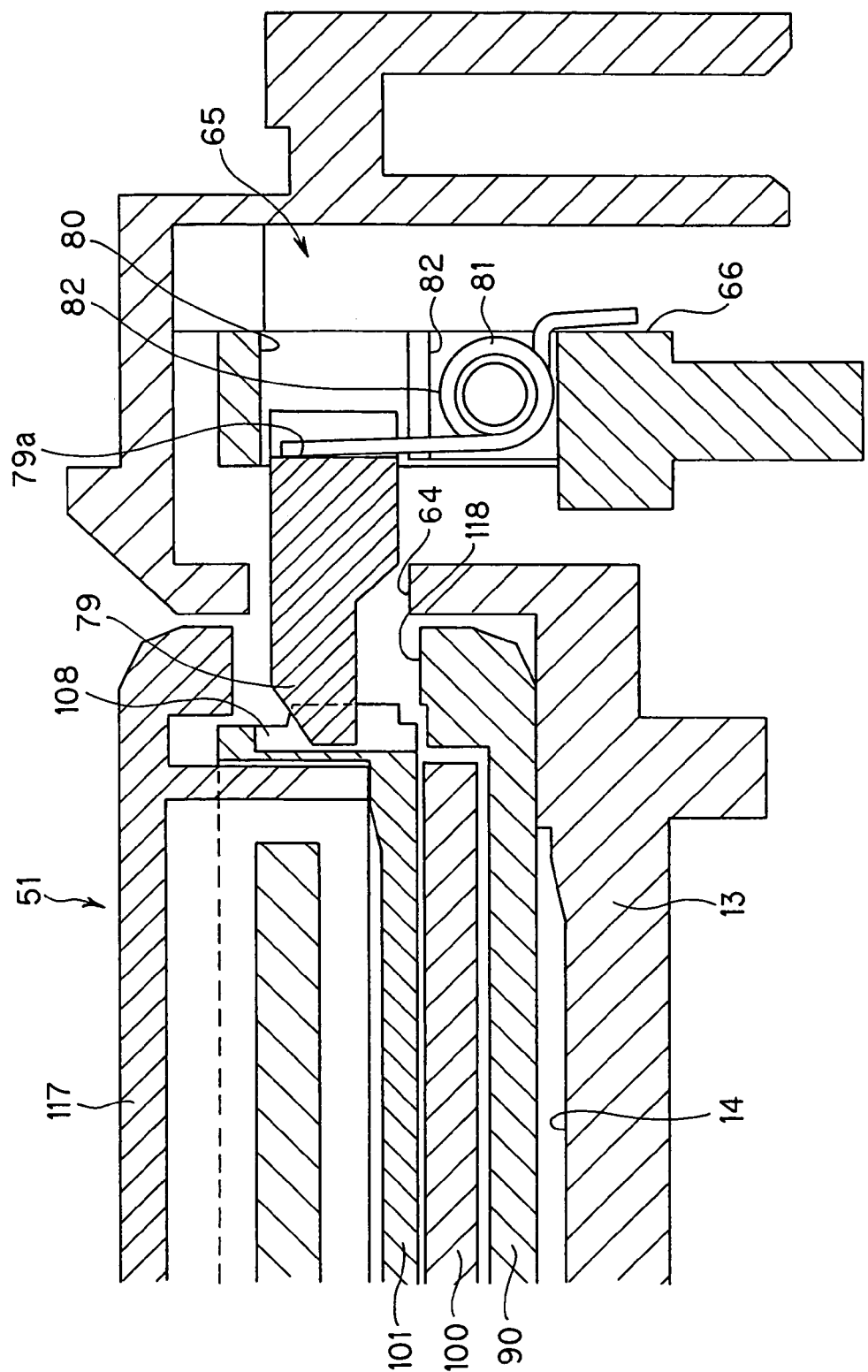
FIG. 38 is a schematic cross-sectional view showing the shutter opening/closing mechanism in the state shown in FIG. 36.
Figure 39:
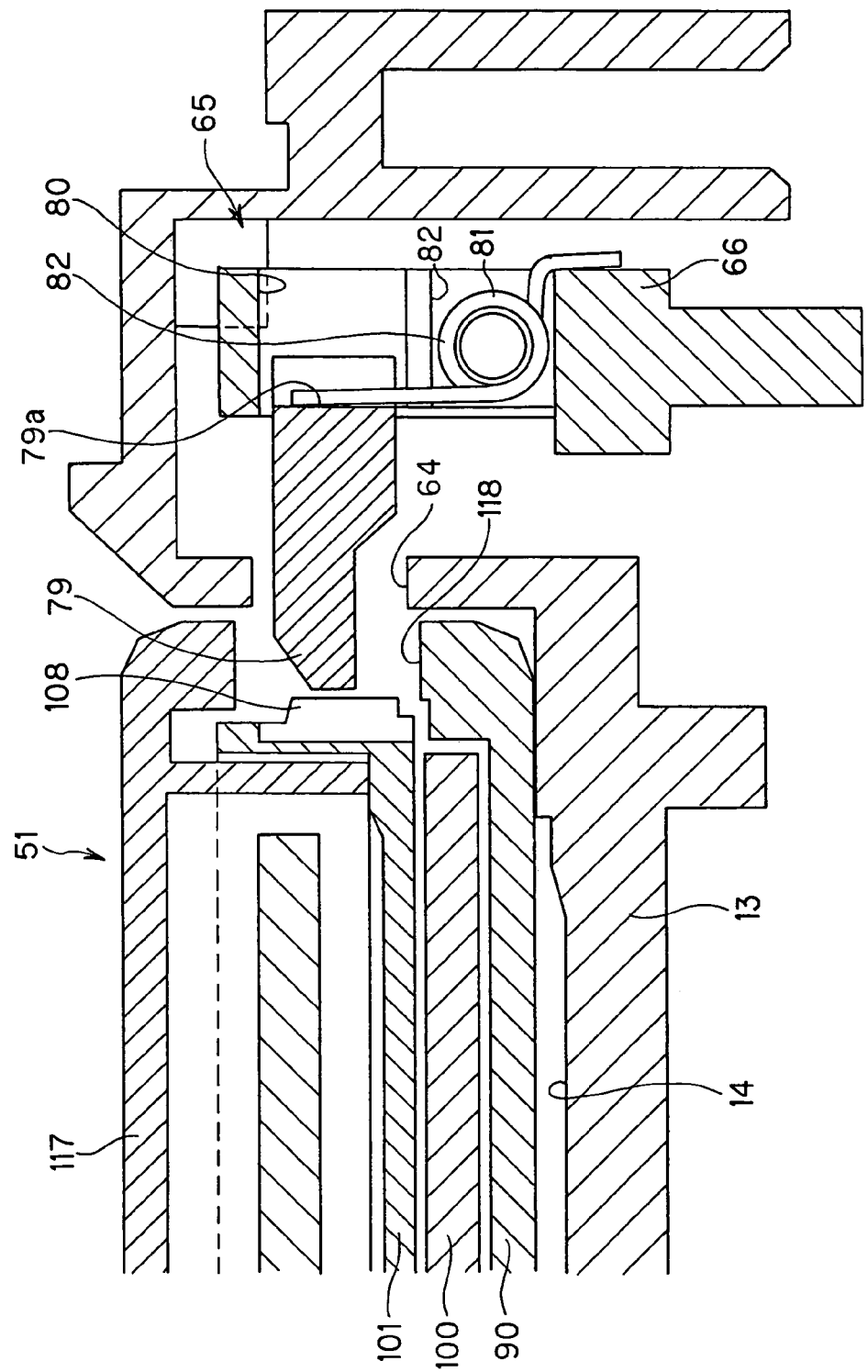
FIG. 39 is a schematic cross-sectional view showing the state in which the shutter opening/closing mechanism has been moved backwards.

Concretely, the state shown in FIG. 38 is such a one in which the aperture 91 of the cartridge 51 shown in FIG. 36 is opened completely. When the tray 13 is further intruded from this state, as shown in FIG. 39, the cam 85 provided on the back side of the tray 13 thrusts back the boss 69 of the opening/closure base 66 to cause the opening/closure base 66 to be retreated to clear the holder 14 of the tray 13 via slit 64. This separates the opening/closure base 66 away from the cartridge 51 so that the second engagement member 79 is disengaged from the second mating engagement section 108 of the inner rotor 101.

However, the second engagement member 79 is located in cut-outs 118 of the upper and lower shells 117, 90, that is, within a projection area of the cartridge 51.

Figure 40:
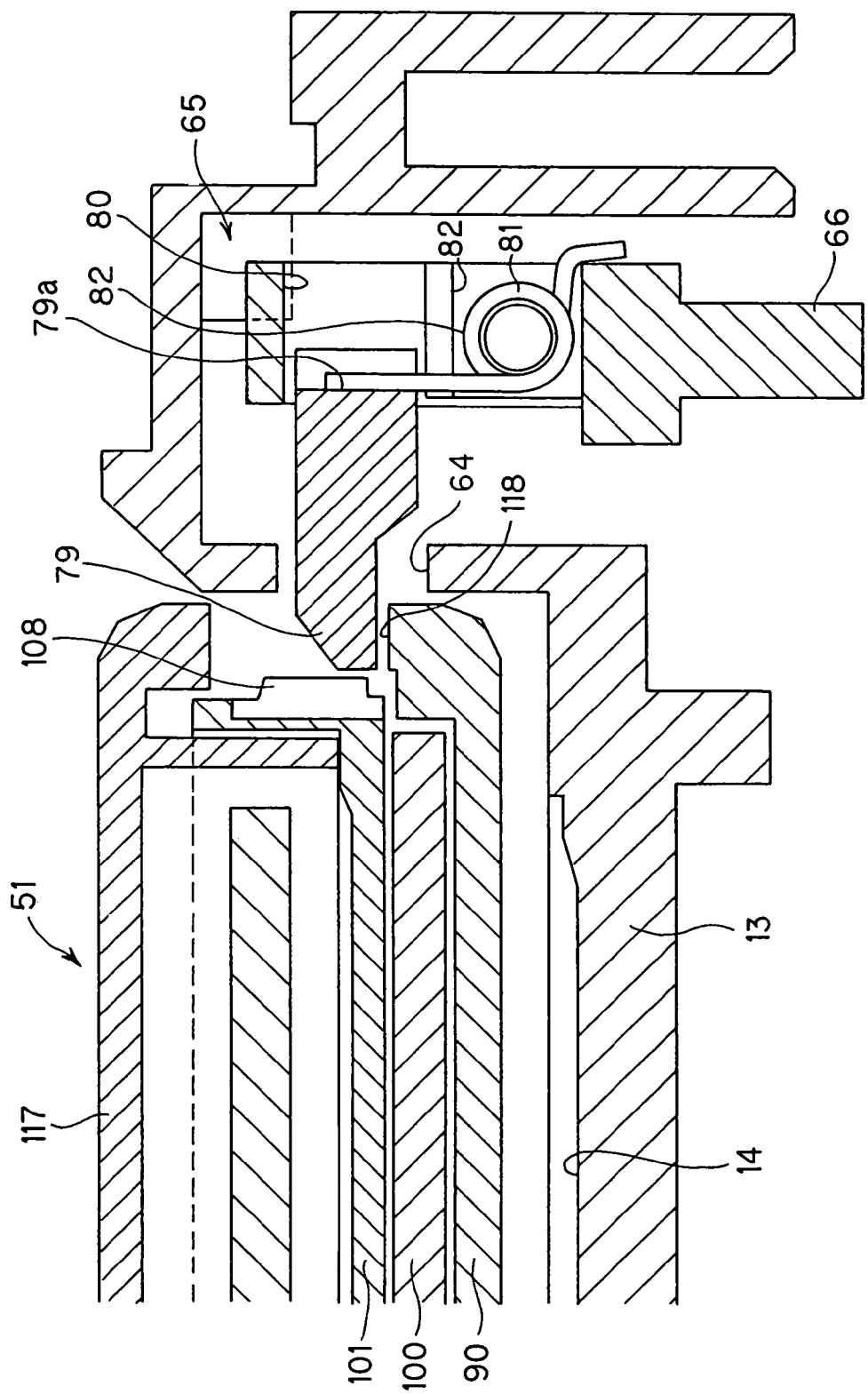
FIG. 40 is a schematic cross-sectional view showing the state in which the cartridge has been floated from the tray.

If, in this state, the chuck sliders 56 are pushed out in a direction reversed from the pull-in direction, the base unit 25 is uplifted by the cam grooves 59 of the chuck sliders 56, as shown in FIG. 40. The cartridge 51 is floated upwards from the holder 14 of the tray 13 and supported to a high accuracy by the support rods 45 and the support arms 46.

The second engagement member 79 is moved downwards in the cut-outs 118 of the cartridge 51. However, the second engagement member 79 is above the lower surfaces of the cut-outs 118, so that there is a gap therebetween. Thus, with the present shutter opening/closing mechanism 65, it is possible to reduce the retreating stroke with respect to the cartridge 51.

The closure operation of the shutter of the cartridge for BD 51 by the above-described shutter opening/closing mechanism 65 when the cartridge for BD 51 is ejected and moved to the take-out position is hereinafter explained.

The shutter closure movement by the shutter opening/closing mechanism 65 is carried out in a sequence reversed from the above-described shutter opening movement, that is, in a sequence shown in FIGS. 37 to 28.

That is, with the present disc driving apparatus 1, when the tray 13, carrying the cartridge 51, is pulled out from the outer casing 10, from the state in which the shutter members 100 of the cartridge 51 has been completely opened, a thrusting boss 125, provided to the rear end of the opening/closure base 66, thrusts the thrust part 96 of the lock lever 93, thereby causing clockwise rotation of the lock lever 93 about the pin 92 as the center of rotation, and disengaging the lock part 94 from the terminal end of the projection 111 of the inner rotor 101, as shown in FIG. 36. This releases the lock of the inner rotor 101 by the lock lever 101. On the other hand, the second engagement member 79 is engaged with the second mating engagement section 108 of the inner rotor 101.

When the tray 13 is pulled out from this state to outside the outer casing 10, the inner rotor 101 is rotated counterclockwise in the drawing, in conjunction with the relative movement of the opening/closure base 66, by engagement of the second mating engagement section 108 with the second engagement member 79, as shown in FIG. 35.

If then the inner rotor 101 is rotated from this state counterclockwise in the drawing, by engagement of the second mating engagement section 108 and the second engagement member 79, the rack member 70 meshes with the segment gear 109 of the inner rotor 101, as shown in FIG. 34. The shutter members 100 start to close the aperture 106 of the inner rotor 101, as the shutter members are rotated relative to the inner rotor 101 about the pivot pins 102 as the center of rotation.

If the inner rotor 101 is rotated counterclockwise, relative to the lower shell 90, by meshing of the rack member 70 with the segment gear 109, the second engagement member 79 is disengaged from the second mating engagement section 108 of the inner rotor 101, as shown in FIG. 33.

If then the inner rotor 101 is further rotated counterclockwise in the drawing, relative to the lower shell 90, by the by meshing of the rack member 70 with the segment gear 109, the shutter members 100 substantially close the aperture 106 of the inner rotor 101, as the shutter members 100 are rotated relative to the inner rotor 101 about the pivot pins 102 as the center of rotation, as shown in FIGS. 32 and 31.

When the inner rotor 101 is rotated approximately 40° clockwise in the drawing, from the opened position shown in FIG. 37, the first engagement member 75 is engaged with the first mating engagement section 110 of the inner rotor 101, as shown in FIG. 30.

When the inner rotor 101 is rotated from this state approximately 50° counterclockwise in the drawing, from the open position shown in FIG. 37, by engagement of the first mating engagement section 110 with the first engagement member 75, as shown in FIG. 29, the shutter members 100 completely close the aperture 106 of the inner rotor 101.

If the inner rotor 101 is further rotated from this state counterclockwise in the drawing, relative to the lower shell 90, by engagement of the first mating engagement section 110 with the first engagement member 75, as shown in FIG. 28, the inner rotor 101 is locked in the closed state, by the lock part 94 of the lock lever 93 engaging with the second mating engagement section 108 of the inner rotor 101.

If the loading has been carried out not in a state in which the shutter members 100 of the cartridge 51 have not completely closed the aperture 106 of the inner rotor 101, as shown in FIGS. 28 and 29, but in a state in which the aperture 106 of the inner rotor 101 is partially opened, as shown in FIGS. 30 and 32, the opening operation is carried out without the function of the first engagement member 75 on the forward side of the shutter opening/closing mechanism 65 being fully displayed. That is, the rack member 70 is directly engaged with the segment gear 109 of the inner rotor 101 for causing clockwise rotation of the inner rotor 101, with the first engagement member 75 not necessarily engaging with the first mating engagement section 110 of the inner rotor 101. Thus, in this case, the opening operation of the shutter members 100 occurs more quickly than in the case of the loading operation from the state of complete closure of the shutter members 100. From this state, the opening/closure base 66 is moved relative to the lateral surface of the cartridge 51 and, after the rack member 70 is detached from the segment gear 109, the second engagement member 79 is slid between the segment gear 109 on the outer rim of the inner rotor 101 and the second mating engagement section 108 until ultimately the second engagement member is engaged with the second mating engagement section 108 of the inner rotor 101, as shown in FIG. 34. From this state, the inner rotor 101 is rotated clockwise, by the engagement of the second mating engagement section 108 and the second engagement member 79, until the aperture 91 is completely opened by the shutter members 100 shown in FIGS. 36 and 37.

Thus, in this disc driving apparatus 1, even if the cartridge 51 is set on the tray 13 in the partially opened state of the shutter members 100, the fully open state of the shutter members 100 may be achieved on the recording and/or reproducing apparatus, thus assuring a smooth recording and/or reproducing operation.

On the other hand, if the ejection has been carried out not in a state in which the shutter members 100 of the cartridge 51 have not completely opened the aperture 106 of the inner rotor 101, as shown in FIG. 37, but in a state in which the aperture 106 of the inner rotor 101 is partially closed, as shown in FIGS. 34 and 35, the closure operation is carried out without the function of the first engagement member 75 on the forward side of the shutter opening/closing mechanism 65 being fully displayed. That is, the rack member 70 is directly engaged with the segment gear 109 of the inner rotor 101 for causing counterclockwise rotation of the inner rotor 101, with the second engagement member 79 not necessarily engaging with the first mating engagement section 110 of the inner rotor 101. Thus, in this case, the closure operation of the shutter members 100 occur more quickly than in the case of the ejecting operation from the state of complete opening of the shutter members 100. From this state, the opening/closure base 66 is moved relative to the lateral surface of the cartridge 51 and, after the rack member 70 is detached from the segment gear 109, the first engagement member 75 is slid between the segment gear 109 on the outer rim of the inner rotor 101 and the first mating engagement section 110 until ultimately the first engagement member is engaged with the first mating engagement section 110 of the inner rotor 101, as shown in FIG. 30. From this state, the inner rotor 101 is rotated counterclockwise, by the engagement of the first mating engagement section 110 and the first engagement member 75, until the aperture 91 is completely closed by the shutter members 100 shown in FIGS. 28 and 29.

Thus, in this disc driving apparatus 1, even if the cartridge 51 is set on the tray 13 in the partially opened state of the shutter members 100 and ejected, the cartridge 51 may be ejected as the shutter members 100 is necessarily fully closed at the pull-out position, thus preventing the contamination of the optical disc in the cartridge 51.

In the above-described shutter opening/closing mechanism 65, the first engagement member 75 and the second engagement member 79, mounted on the opening/closure base 66, are biased by the first torsion coil spring 77 and the second torsion coil spring 81 in a direction protruding from the holding openings 76 and 80, such that the first engagement member 75 and the second engagement member 79 may be pushed into the holding openings 76 and 80 against this biasing force. Additionally, the distal ends of the first engagement member 75 and the second engagement member 79 may be pivotally moved along the longitudinal direction of the opening/closure base 66.

In this case, the first engagement member 75 and the second engagement member 79 may be of a height larger than the stroke of thrusting the first engagement member 75 and the second engagement member 79 into the holding openings 76, 80.

Thus, in the present shutter opening/closing mechanism 65, the state of engagement of the first engagement member 75 and the second engagement member 79 with the first mating engagement section 110 and with the second mating engagement section 108 of the inner rotor 101 in the case of the relative movement of the opening/closure base 66 along the lateral side of the cartridge 51 may be maintained for prolonged time.

Thus, with the above-described disc driving apparatus 1, the first engagement member 75, rack member 70 and the second engagement member 79 may positively be engaged with the first mating engagement section 110, segment gear 109 and with the second mating engagement section 108 of the inner rotor 101, thus enabling a positive opening/closure movement of the shutter members 100. In particular, it is possible to take up size variations in the components, such as the tray 13 or the cartridge 51, thus enabling more reliable opening/closure operations of the shutter members 100. it is also possible to improve compatibility for cartridges having different shutter structures.

Moreover, in the shutter opening/closing mechanism 65, the distal ends of the first engagement member 75 and the second engagement member 79 perform fore-and-aft movements when the first engagement member 75 and the second engagement member 79 are engaged with or disengaged from the first mating engagement section 110 and the second mating engagement section 108, thereby reducing the load otherwise applied to the distal ends.

Thus, with the above-described disc driving apparatus 1, the engagement/disengagement of the first engagement member 75 and the second engagement member 79 with respect to the first mating engagement section 110 and the second mating engagement section 108 may be improved in performance, thus assuring the shutter opening/closure operations with higher reliability. Additionally, with the present shutter opening/closing mechanism 65, it is possible to reduce the load produced when the first mating engagement section 110 and the second mating engagement section 108 are in sliding contact with the outer rim of the inner rotor 101.

Moreover, the first engagement member 75 and the second engagement member 79 are mounted to the opening/closure base 66 as paired engagement lugs 75b, 79b are engaged in the holding openings 76, 80, with the distal ends protruding from the holding openings 76, 80, and as the proximal ends are carried in a biased state by the opposite ends of the first torsion coil spring 77.

This assures facilitated mounting of the first engagement member 75 and the second engagement member 79 to the opening/closure base 66. With the first engagement member 75 and the second engagement member 79, the paired engagement lugs 75b, 79b of which are not in the form of complicated hooks exploiting the elasticity of the molded product, but are in the form of simple projections, there is no risk of fracture otherwise caused by creep deformation.

Moreover, with the shutter opening/closing mechanism 65, the rack member 70 and the segment gear 109 of the inner rotor 101 may be engaged deeply with each other by thrusting the rack member 70 towards the cartridge 51, by the coil springs 68, 74 provided on the opening/closure base 66, without dependency on the ideal pitch distance in which the pitch circles of the rack member and the segment gear contact each other, thereby preventing the rack member and the segment gear from disengaging from each other.

Additionally, with the shutter opening/closing mechanism 65, in which the rack member 70 is biased by a pair of compression coil springs 74 towards a lateral surface of the cartridge 51, the rack member 70 may be engaged with the segment gear 109 even in case the normal line drawn to the movement direction of the rack member 70 is not coincident with the meshing direction of the segment gear 109, that is, even in case the end of the rack member 70 is inclined within the cut-out 118 formed in the cartridge 51.

The present invention is not limited to the disc driving apparatus 1 employing disc-shaped recording mediums of reciprocally incompatible formats, that is, DVD, CD and BD. That is, the shutter opening/closing mechanism of the present invention may be broadly applied to a disc driving apparatus of the type employing a disc cartridge in which the disc-shaped recording medium, inner rotor and the shutter are provided in the housing and in which the aperture of the housing is opened or closed by the shutter by rotation of the inner rotor.

What is claimed is:

1. A shutter opening/closing mechanism for a disc cartridge comprising a disc-shaped recording medium, an inner rotor, a shutter and a housing in which an aperture is formed, said aperture opened or closed by said shutter by rotation of said inner rotor, said shutter opening/closing mechanism comprising:
   a base relatively movable along one lateral surface of said housing;
   a first engagement member provided to one end of said base for engaging with a first mating engagement section provided to an outer rim of said inner rotor facing outwards from a lateral side of said housing when said shutter is closed;
   a second engagement member provided to an other end of said base for engaging with a second mating engagement section provided to the outer rim of said inner rotor facing outwards from a lateral side of said housing when said shutter is opened;
   said first engagement member and said second engagement member being mounted to said base so that both engagement members are movable both linearly, perpendicular to a surface of said housing, and angularly, coincident with said surface of said housing;
   a rack member mounted between said first engagement member and said second engagement member of said base for meshing with a gear provided in a preset area of the outer rim of said inner rotor between said first mating engagement section and said second mating engagement section; and
   a first torsion coil spring and a second torsion coil spring each having one end of the coiled part of the wire retained by said base and an other end resiliently movable in a direction perpendicular to the surface and in contact with one of the first or second engagement members in a manner to allow the engagement members to move both linearly and angularly.

2. The shutter opening/closing mechanism according to claim 1 further comprising:
   said first engagement member and said second engagement member being retained by holders provided to said base with distal ends of the first engagement member and the second engagement member protruded from said holders towards one lateral surface of said housing.

3. The shutter opening/closing mechanism according to claim 1 wherein said rack member is mounted to said base so that said rack member is moved in a direction perpendicular to a direction along said lateral surface of said housing.

4. The shutter opening/closing mechanism according to claim 3 further comprising:

biasing means for biasing said rack member towards said lateral surface of said housing;

and wherein said rack member is retained by a holder provided to said base and biased by said biasing means for protruding from said holder towards a lateral surface of said casing.

5. The shutter opening/closing mechanism according to claim 4 wherein said biasing means includes a compression coil spring arranged between said rack member and the holder of said base.

6. A disc driving apparatus for use with a disc cartridge comprising: a disc-shaped recording medium, an inner rotor, a shutter and a housing in which an aperture is formed, said aperture opened or closed by said shutter by rotation of said inner rotor, said disc driving apparatus comprising:

a loading mechanism for causing movement of said disc cartridge between a pull-out position in which the disc cartridge is pulled out to outside a main body unit of the apparatus and a housed position in which the disc cartridge is housed within said main body unit of the apparatus; and a shutter opening/closing mechanism for opening/closing said shutter by rotating said inner rotor of said disc cartridge moved by said loading mechanism between said pull-out position and said housed position to effect opening/closure of said shutter;

said shutter opening/closing mechanism including a base relatively movable along one lateral surface of said housing; a first engagement member provided to one end of said base for engaging with a first mating engagement section provided to an outer rim of said inner rotor facing outwards from a lateral side of said housing when said shutter is closed; a second engagement member provided to an other end of said base for engaging with a second mating engagement section provided to the outer rim of said inner rotor facing outwards from a lateral side of said housing when said shutter is opened;

said first engagement member and said second engagement member being mounted to said base so that both engagement members are movable both linearly, perpendicular to a surface of said housing, and angularly, coincident with said surface of said housing;

a rack member mounted between said first engagement member and said second engagement member of said base for meshing with a gear provided in a preset area of the outer rim of said inner rotor between said first mating engagement section and said second mating engagement section; and a first torsion coil spring and a second torsion coil spring each having one end of the coiled part of the wire retained by said base and an other end resiliently movable in a direction perpendicular to the surface and in contact with one of the first or second engagement members in a manner to allow the engagement members to move both linearly and angularly.

7. The disc driving apparatus according to claim 6 wherein said shutter opening/closing mechanism further comprises:

said first engagement member and said second engagement member being retained by holders provided to said base with distal ends of the first engagement member and the second engagement member protruded from said holders towards one lateral surface of said housing and with proximal ends thereof biased by opposite ends of said first torsion coil spring and said second torsion coil spring.

8. The disc driving mechanism according to claim 6 wherein said rack member is mounted to said base so that said rack member is moved in a direction perpendicular to a direction along said lateral surface of said housing.

9. The disc driving mechanism according to claim 8 wherein the shutter opening/closing mechanism further comprises:

biasing means for biasing said rack member towards said lateral surface of said housing;

and wherein said rack member is retained by a holder provided to said base and biased by said biasing means for protruding from said holder towards a lateral surface of said casing.

10. The disc driving mechanism according to claim 9 wherein said biasing means includes a compression coil spring arranged between said rack member and the holder of said base.

* * * * *